(12) United States Patent
Cummings

(10) Patent No.: US 7,515,327 B2
(45) Date of Patent: Apr. 7, 2009

(54) METHOD AND DEVICE FOR CORNER INTERFEROMETRIC MODULATION

(75) Inventor: William J. Cummings, Millbrae, CA (US)

(73) Assignee: IDC, LLC, Pleasanton, CA (US)

(*) Notice: Subject to any disclaimer, the term of this patent is extended or adjusted under 35 U.S.C. 154(b) by 0 days.

(21) Appl. No.: 12/018,038

(22) Filed: Jan. 22, 2008

(65) Prior Publication Data
US 2008/0112036 A1    May 15, 2008

Related U.S. Application Data

(63) Continuation of application No. 11/103,378, filed on Apr. 11, 2005, now Pat. No. 7,321,456.

(60) Provisional application No. 60/613,597, filed on Sep. 27, 2004.

(51) Int. Cl.
*G02B 26/00* (2006.01)

(52) U.S. Cl. ........................ 359/290; 359/291

(58) Field of Classification Search ................ 359/290, 359/291, 295, 223, 224
See application file for complete search history.

(56) References Cited

U.S. PATENT DOCUMENTS

| | | | |
|---|---|---|---|
| 3,037,189 A | 5/1962 | Barrett et al. |
| 3,210,757 A | 10/1965 | Jacob |
| 3,701,586 A | 10/1972 | Goetz |
| 3,728,030 A | 4/1973 | Hawes |
| 3,955,190 A | 5/1976 | Teraishi |
| 4,403,248 A | 9/1983 | te Velde |
| 4,441,791 A | 4/1984 | Hornbeck |
| 4,786,128 A | 11/1988 | Birnbach |
| 4,859,060 A | 8/1989 | Katagiri et al. |
| 4,954,789 A | 9/1990 | Sampsell |
| 4,956,619 A | 9/1990 | Hornbeck |

(Continued)

FOREIGN PATENT DOCUMENTS

EP    0 361 981    4/1990

(Continued)

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

(Continued)

*Primary Examiner*—Timothy J Thompson
(74) *Attorney, Agent, or Firm*—Knobbe Martens Olson & Bear LLP

(57) ABSTRACT

A display is described, wherein the display includes surfaces arranged at a non-zero angle to one another. A least one of the surfaces may include an interferometric modulator. Compensation for color shift can be provided through the use of two or three surfaces arranged at an angle to one another, the surfaces having similar interferometric modulators. Methods of making such a display are also described. A brighter display can be provided through the use of three surfaces arranged orthogonally to one another, where each of the surfaces has an interferometric modulator which reflects a different color of light. Either additive or subtractive methods can be used to generate light of a particular color.

22 Claims, 15 Drawing Sheets

U.S. PATENT DOCUMENTS

| | | |
|---|---|---|
| 4,982,184 A | 1/1991 | Kirkwood |
| 5,022,745 A | 6/1991 | Zahowski et al. |
| 5,028,939 A | 7/1991 | Hornbeck et al. |
| 5,034,351 A | 7/1991 | Sun et al. |
| 5,091,983 A | 2/1992 | Lukosz |
| 5,096,279 A | 3/1992 | Hornbeck et al. |
| 5,315,370 A | 5/1994 | Bulow |
| 5,381,232 A | 1/1995 | Van Wijk |
| 5,457,900 A | 10/1995 | Roy et al. |
| 5,499,037 A | 3/1996 | Nakagawa et al. |
| 5,526,172 A | 6/1996 | Kanack |
| 5,559,358 A | 9/1996 | Burns et al. |
| 5,636,052 A | 6/1997 | Arney et al. |
| 5,638,084 A | 6/1997 | Kalt |
| 5,646,729 A | 7/1997 | Koskinen et al. |
| 5,646,768 A | 7/1997 | Kaeiyama |
| 5,661,592 A | 8/1997 | Bornstein et al. |
| 5,665,997 A | 9/1997 | Weaver et al. |
| 5,710,656 A | 1/1998 | Goosen |
| 5,786,927 A | 7/1998 | Greywall et al. |
| 5,796,378 A | 8/1998 | Yoshida |
| 5,808,781 A | 9/1998 | Arney et al. |
| 5,818,095 A | 10/1998 | Sampsell |
| 5,825,528 A | 10/1998 | Goosen |
| 5,835,256 A | 11/1998 | Huibers |
| 5,838,484 A | 11/1998 | Goossen et al. |
| 5,867,301 A | 2/1999 | Engle |
| 5,867,302 A | 2/1999 | Fleming |
| 5,905,482 A | 5/1999 | Hughes et al. |
| 5,959,777 A | 9/1999 | Whitehead |
| 6,028,689 A | 2/2000 | Michalicek et al. |
| 6,040,937 A | 3/2000 | Miles |
| 6,055,090 A | 4/2000 | Miles |
| 6,282,010 B1 | 8/2001 | Sulzbach et al. |
| 6,327,071 B1 | 12/2001 | Kimura |
| 6,356,378 B1 | 3/2002 | Huibers |
| 6,384,952 B1 | 5/2002 | Clark et al. |
| 6,417,868 B1 | 7/2002 | Bock |
| 6,433,917 B1 | 8/2002 | Mei et al. |
| 6,438,282 B1 | 8/2002 | Takeda et al. |
| 6,452,712 B2 * | 9/2002 | Atobe et al. ............... 359/291 |
| 6,466,354 B1 | 10/2002 | Gudeman |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,650,455 B2 | 11/2003 | Miles |
| 6,657,386 B2 | 12/2003 | Koshio et al. |
| 6,657,832 B2 | 12/2003 | Williams et al. |
| 6,661,561 B2 | 12/2003 | Fitzpatrick et al. |
| 6,674,562 B1 | 1/2004 | Miles et al. |
| 6,680,792 B2 | 1/2004 | Miles |
| 6,698,295 B1 | 3/2004 | Sherrer |
| 6,710,908 B2 | 3/2004 | Miles et al. |
| 6,715,889 B2 * | 4/2004 | Nishima et al. ............. 353/101 |
| 6,753,937 B2 | 6/2004 | Grupp |
| 6,778,034 B2 | 8/2004 | Nir et al. |
| 6,794,119 B2 | 9/2004 | Miles |
| 6,841,081 B2 | 1/2005 | Chang et al. |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,885,409 B2 | 4/2005 | Stephenson et al. |
| 6,891,658 B2 | 5/2005 | Whitehead et al. |
| 6,912,022 B2 | 6/2005 | Lin et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,959,990 B2 | 11/2005 | Penn |
| 6,980,350 B2 | 12/2005 | Hung et al. |
| 6,983,135 B1 | 1/2006 | Tsai et al. |
| 7,006,272 B2 | 2/2006 | Tsai |
| 7,119,945 B2 | 10/2006 | Kothari et al. |
| 7,123,216 B1 | 10/2006 | Miles |
| 7,126,738 B2 | 10/2006 | Miles |
| 7,135,643 B2 | 11/2006 | van Haaster et al. |
| 7,161,728 B2 | 1/2007 | Sampsell et al. |
| 7,198,873 B2 | 4/2007 | Geh et al. |
| 7,221,495 B2 | 5/2007 | Miles et al. |
| 7,236,284 B2 | 6/2007 | Miles |
| 7,250,930 B2 | 7/2007 | Hoffman et al. |
| 7,372,619 B2 | 5/2008 | Miles |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0015215 A1 | 2/2002 | Miles |
| 2002/0024711 A1 | 2/2002 | Miles |
| 2002/0054424 A1 | 5/2002 | Miles |
| 2002/0070931 A1 | 6/2002 | Ishikawa |
| 2002/0075555 A1 | 6/2002 | Miles |
| 2002/0114558 A1 | 8/2002 | Nemirovsky |
| 2002/0126364 A1 | 9/2002 | Miles |
| 2002/0146200 A1 | 10/2002 | Kurdle et al. |
| 2002/0149828 A1 | 10/2002 | Miles |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0072070 A1 | 4/2003 | Miles |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0051929 A1 | 3/2004 | Sampsell et al. |
| 2004/0058532 A1 | 3/2004 | Miles et al. |
| 2004/0075967 A1 | 4/2004 | Lynch et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0184766 A1 | 9/2004 | Kim et al. |
| 2004/0207897 A1 | 10/2004 | Lin |
| 2004/0209195 A1 | 10/2004 | Lin |
| 2004/0217919 A1 | 11/2004 | Pichi et al. |
| 2004/0218251 A1 | 11/2004 | Piehl et al. |
| 2004/0240032 A1 | 12/2004 | Miles |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0069209 A1 | 3/2005 | Damera-Vankata et al. |
| 2005/0078348 A1 | 4/2005 | Lin |
| 2005/0168849 A1 | 8/2005 | Lin |
| 2005/0195462 A1 | 9/2005 | Lin |
| 2005/0249966 A1 | 11/2005 | Tung et al. |
| 2005/0253820 A1 | 11/2005 | Horiuchi |
| 2006/0007517 A1 | 1/2006 | Tsai |
| 2006/0044654 A1* | 3/2006 | Vandorpe et al. ............. 359/834 |
| 2006/0220160 A1 | 10/2006 | Miles |
| 2006/0262380 A1 | 11/2006 | Miles |
| 2006/0268388 A1 | 11/2006 | Miles |

| | | | |
|---|---|---|---|
| 2007/0177247 | A1 | 8/2007 | Miles |
| 2007/0229936 | A1 | 10/2007 | Miles |
| 2008/0037093 | A1 | 2/2008 | Miles |
| 2008/0088904 | A1 | 4/2008 | Miles |
| 2008/0088910 | A1 | 4/2008 | Miles |
| 2008/0088911 | A1 | 4/2008 | Miles |
| 2008/0088912 | A1 | 4/2008 | Miles |
| 2008/0106782 | A1 | 5/2008 | Miles |

FOREIGN PATENT DOCUMENTS

| | | |
|---|---|---|
| EP | 1 275 997 | 1/2003 |
| EP | 1 439 515 | 7/2004 |
| JP | 11211999 | 8/1999 |
| JP | 2002-062490 | 2/2000 |
| JP | 2001-221913 | 8/2001 |
| JP | 2002-221678 | 8/2002 |
| JP | 2004-212638 | 7/2004 |
| JP | 2004-212680 | 7/2004 |
| WO | WO 98/57212 | 12/1998 |
| WO | WO 2004/042687 | 5/2004 |
| WO | WO 2005/010566 | 2/2005 |

OTHER PUBLICATIONS

Aratani K., et al., "Surface micromachined tuneable interferometer array," Sensors and Actuators, pp. 17-23. (1994).

Conner, "Hybrid Color Display Using Optical Interference Filter Array," SID Digest, pp. 577-580 (1993).

Jerman et al., "A Miniature Fabry-Perot Interferometer with a Corrugated Silicon Diaphragm Support", (1988).

Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.

Miles, Mark, W., "A New Reflective FDP Technology Using Interferometric Modulation", The Proceedings of the Society for Information Display (May 11-16, 1997).

Office Action dated Mar. 28, 2007 for U.S. Appl. No. 11/103,378.

Office Action dated Aug. 17, 2006 for U.S. Appl. No. 11/103,378.

Office Action dated Mar. 29, 2006 for U.S. Appl. No. 11/103,378.

Office Action received Jul. 29, 2008 in Chinese App. No. 200510105062.X.

\* cited by examiner

|  | Column Output Signals | |
|---|---|---|
|  | $+V_{bias}$ | $-V_{bias}$ |
| Row Output Signals   0 | Stable | Stable |
| $+\Delta V$ | Release | Actuate |
| $-\Delta V$ | Actuate | Release |

METHOD AND DEVICE FOR CORNER INTERFEROMETRIC MODULATION

RELATED APPLICATIONS

This application is a continuation of U.S. patent application Ser. No. 11/103,378, filed Apr. 11, 2005 now U.S. Pat. No. 7,321,456, now published as U.S. Publication No. 2006-0077515, which claims priority under 35 U.S.C. § 119(e) to U.S. Provisional Application Ser. No. 60/613,597, filed on Sep. 27, 2004, each of which are hereby incorporated by reference in their entirety.

BACKGROUND OF THE INVENTION

1. Field of the Invention

The field of the invention relates to microelectromechanical systems (MEMS).

2. Description of the Related Art

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one embodiment, a display is provided, the display including a substantially transparent substrate, which has at least a first generally planar surface and a second generally planar surface, the second surface at a first non-zero angle to the first surface, at least a first reflective element on the first surface, the reflective element having a first reflectivity which changes in response to a first signal, and at least a second reflective element on the second surface. In further embodiments, the substrate has a third surface and a third reflective element on the surface.

In another embodiment, a method of fabricating a display device is provided, including providing a substrate having at least one positive feature, forming a first electrode over a first surface of the positive feature of the substrate, depositing a dielectric layer over the first electrode, depositing a sacrificial layer over the dielectric layer, forming a flexible layer over the sacrificial layer, removing the sacrificial layer to form an interferometric cavity, thereby allowing the flexible layer to move toward the first electrode; and forming a reflective element on a second surface of the positive feature of the substrate, the second surface at a non-zero angle to the first surface.

In yet another embodiment, a display is provided, the display manufactured by the process of providing a substrate having at least one positive feature forming a first electrode over a first surface of the positive feature of the substrate, depositing a dielectric layer over the first electrode, depositing a sacrificial layer over the dielectric layer, forming a flexible layer over the sacrificial layer, removing the sacrificial layer to form an interferometric cavity, thereby allowing the flexible layer to move toward the first electrode, and forming a reflective element on a second surface of the positive feature of the substrate, the second surface at a non-zero angle to the first surface.

In yet another embodiment, a display is provided, including first means for modulating light, first means for reflecting light towards the first means for modulating, first means for supporting the first means for modulating, and second means for supporting the first reflecting means.

In yet another embodiment, a method of displaying a color is provided, including reflecting light off of a first surface towards a second surface, and reflecting the light toward a viewer, wherein the first surface comprises a first optical element which modulates the light and reflects the light towards the second surface.

In yet another embodiment, a method of manufacturing a display device is provided, the method including providing a first substrate having a generally planar surface, forming a first reflective element on the surface of the first substrate, wherein the first reflective element has a first reflectivity which changes in response to a first signal, providing a second substrate having a generally planar surface, forming a second reflective element on the surface of the second substrate, and positioning the first substrate relative to the second surface such that the surface of the first substrate is at a non-zero angle to the surface of the second substrate.

In yet another embodiment, a display is provided, wherein said display is manufactured by a method including providing a first substrate having a generally planar surface, forming a first reflective element on the surface of the first substrate, wherein the first reflective element has a first reflectivity which changes in response to a first signal, providing a second substrate having a generally planar surface, forming a second reflective element on the surface of the second substrate; and positioning the first substrate relative to the second surface such that the surface of the first substrate is at a non-zero angle to the surface of the second substrate.

DETAILED DESCRIPTION OF CERTAIN EMBODIMENTS

An embodiment of the invention, as discussed in greater detail below, is an interferometric modulator-based display wherein the display includes at least two surfaces oriented at a non-zero angle to one another. When the non-zero angle is roughly 90°, and each of the two surfaces includes an interferometric modulator, such an arrangement can be used to help compensate for color shift as a function of angle of view. A more comprehensive compensation for color shift can be obtained if three surfaces are used, each of them including an interferometric modulator and each of the interferometric modulators having similar reflective characteristics. If a display having at least three surfaces oriented substantially orthogonally to one another is used, and each of those surfaces has an interferometric modulator having a different air gap distance than the others in an unactuated state, subtractive methods can be used to reflect light of a particular color. The use of such subtractive methods advantageously results in a much brighter display when compared to a similar display using additive methods to generate the same color.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
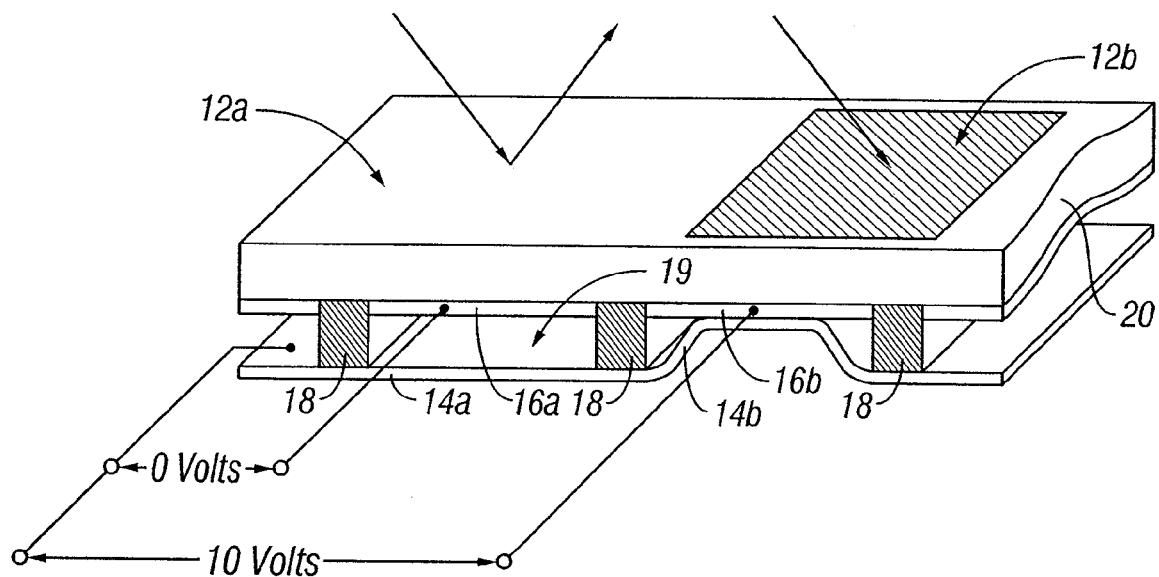
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
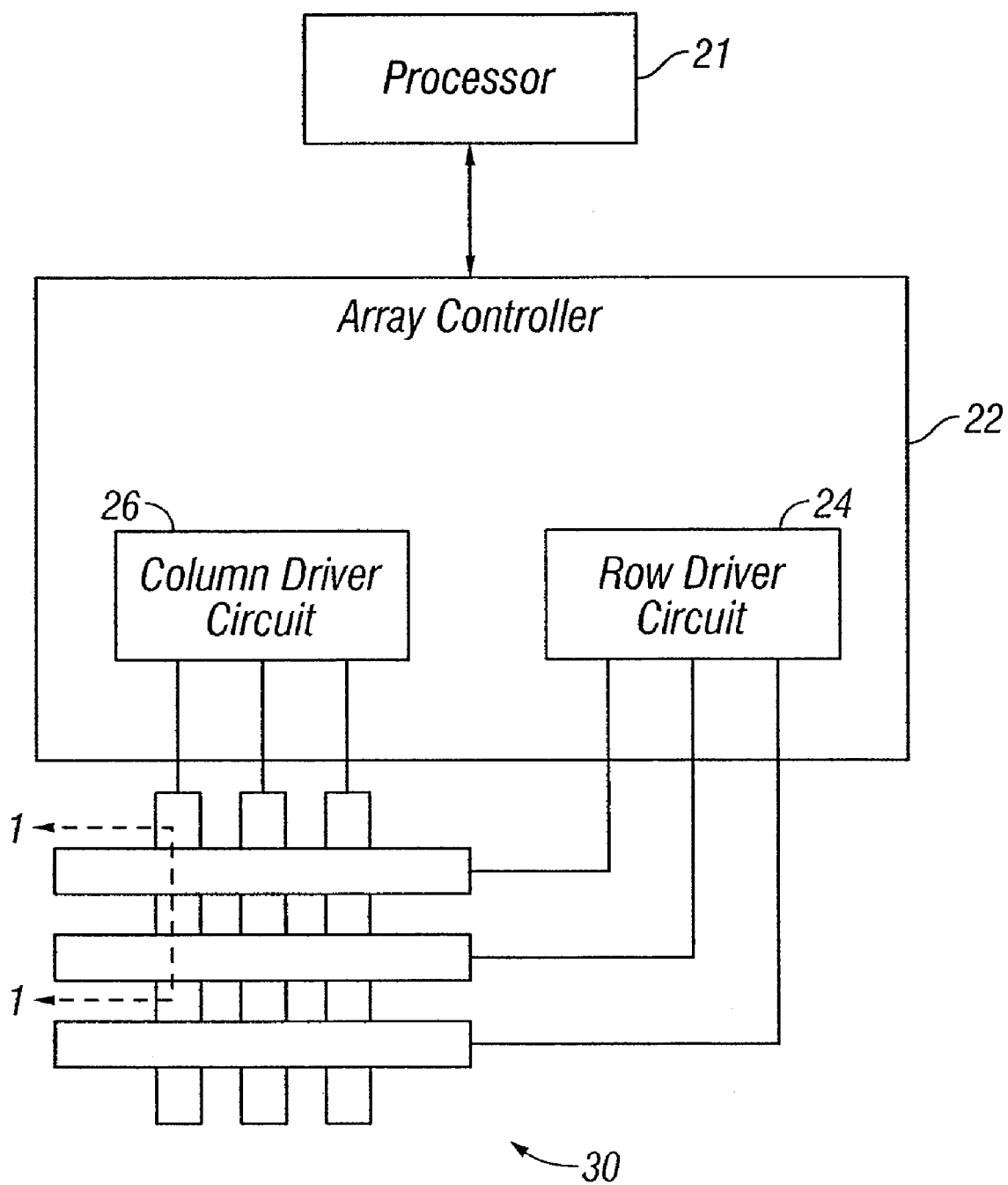
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
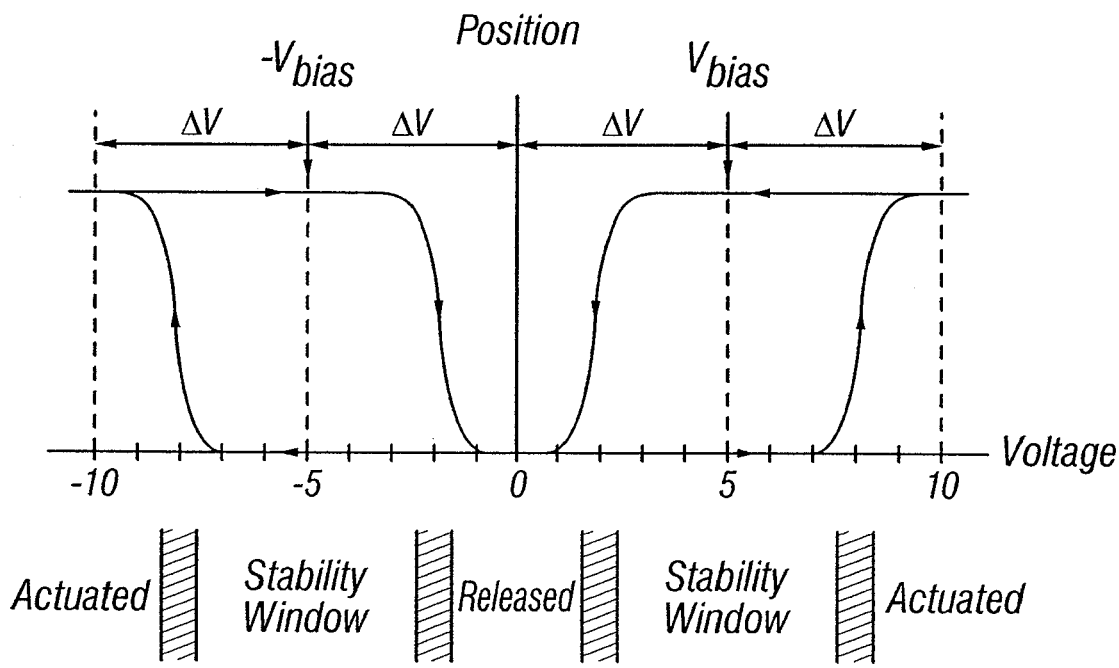
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
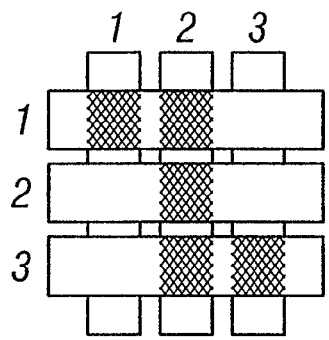
FIGS. 5A and 5B illustrate one exemplary timing diagram for row and column signals that may be used to write a frame of display data to the 3×3 interferometric modulator display of FIG. 2.
Figure 5B:
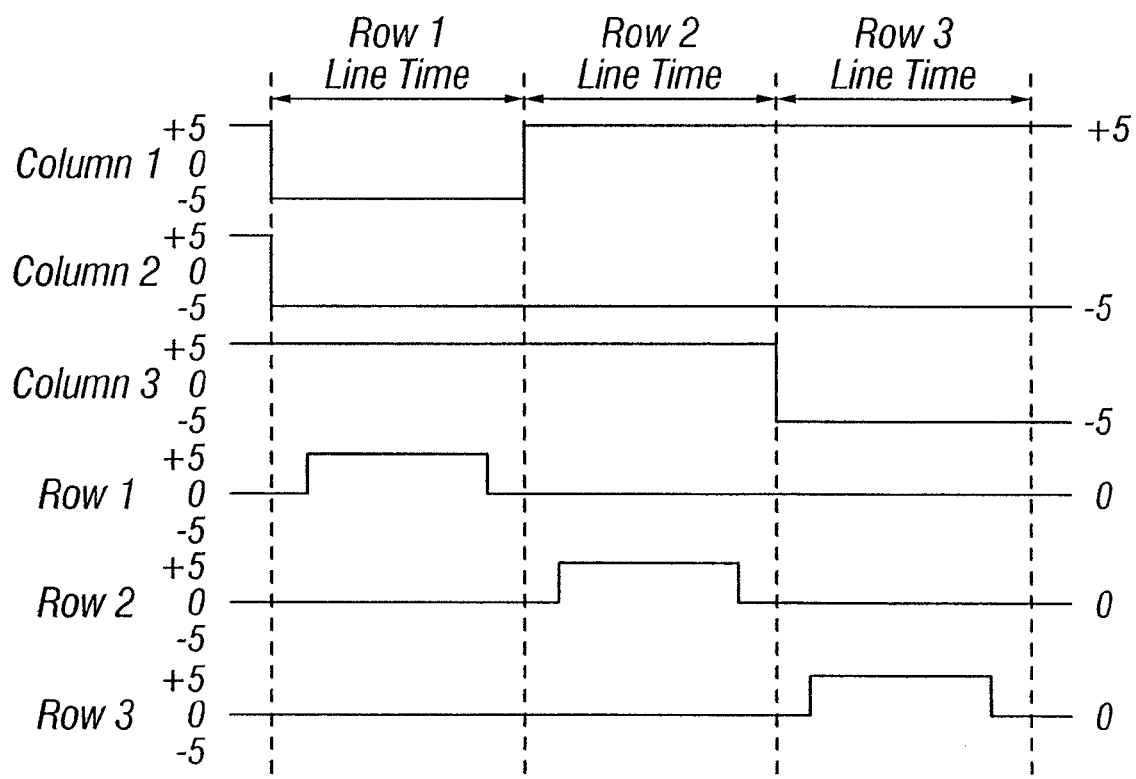

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
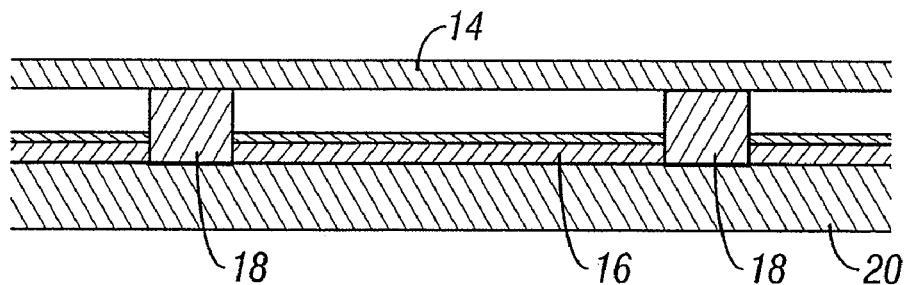
FIG. 6A is a cross section of the device of FIG. 1.
Figure 6B:
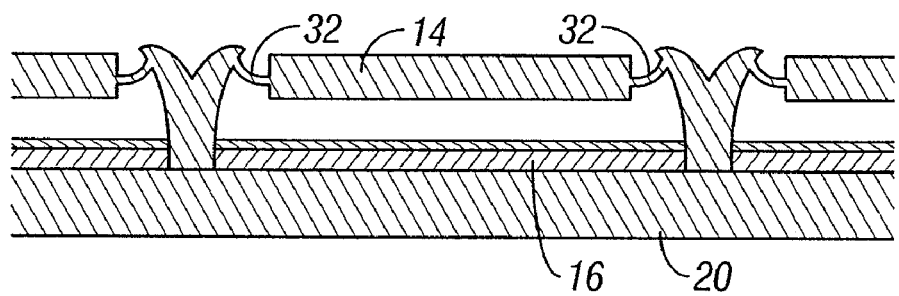
FIG. 6B is a cross section of an alternative embodiment of an interferometric modulator.
Figure 6C:
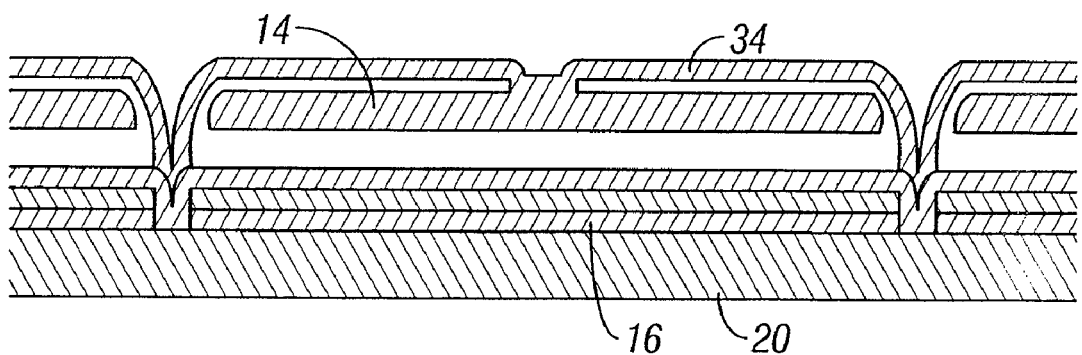
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Figure 7:
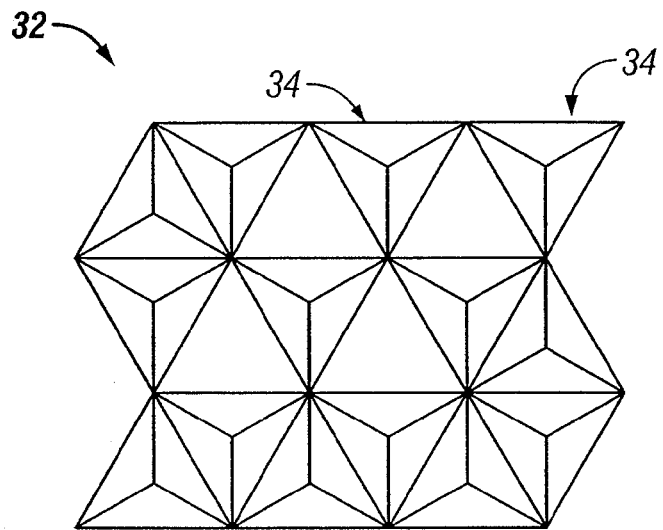
FIG. 7 is a top plan view of a system having an array of corner interferometric modulators configured to interact with light rays.
Figure 7A:
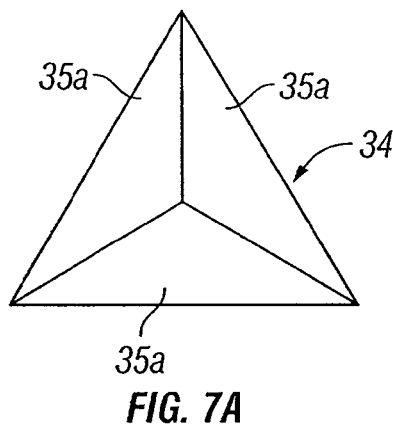
FIG. 7A is a perspective view of one of the corner interferometric modulators of FIG. 7.
Figure 7B:
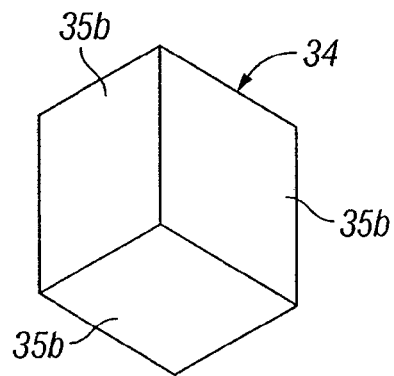
FIG. 7B is a perspective view of a modified corner interferometric modulator.

FIGS. 7, 7A and 7B illustrate various embodiments of a modulation system 32 for modulating light rays. The modulation system 32 comprises an array of corner interferometric modulator display elements 34 (FIG. 7A) configured to control the self interference of light that strikes each corner interferometric modulator display element 34. One or more of the display elements 34 may have at least one movable optical element (not shown) that affects the light exiting away from the system 32. The system 32 may be configured to interact with incident light to provide color display, black/white display, or other desired types of displays. For example, the system 32 may form a display screen for computers, communication devices (e.g., cell phones), electronic paper, pagers, televisions, panels (e.g., display or control panels), billboards, signs, illumination devices, or any other display devices. Preferably, incident light is reflected a number of times before it is directed outwardly from the modulator 34. In the illustrated embodiment, incident light may be reflected three times before it travels away from a modulator display element 34.

Generally, the modulator display elements 34 of FIG. 7A may comprise at least one interferometric optical element (described below) for affecting the light that exits the modulator display element 34. In the illustrated embodiment, the modulator 34 is a corner reflector comprising a plurality of walls, substrates, or surfaces 35a. The modulator 34 of FIG. 7A preferably comprises generally planar surfaces 35a having generally triangular shapes that are generally similar to each other.

FIG. 7B illustrates an alternate embodiment of the a corner modulator display element modulator 34, which has generally square viewing surfaces 35b. In other alternate embodiments, the viewing surfaces of the modulator 34 may have any size and configuration suitable for interacting with light rays.

Figure 8A:
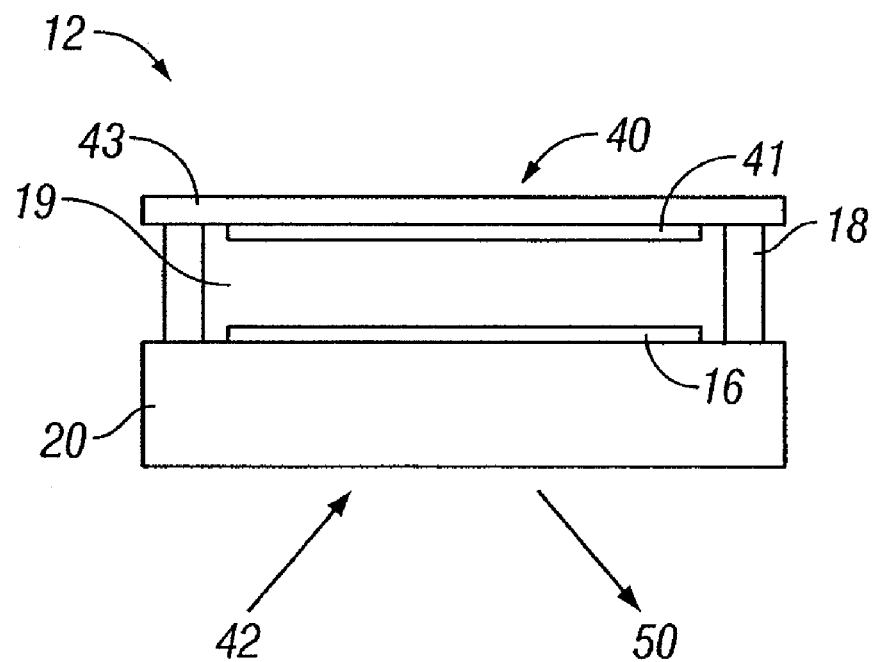
FIG. 8A is a side elevational view of an optical element of an interferometric modulator illustrating its operation in a binary mode and its effect on a light ray when it is in an ON position.
Figure 8B:
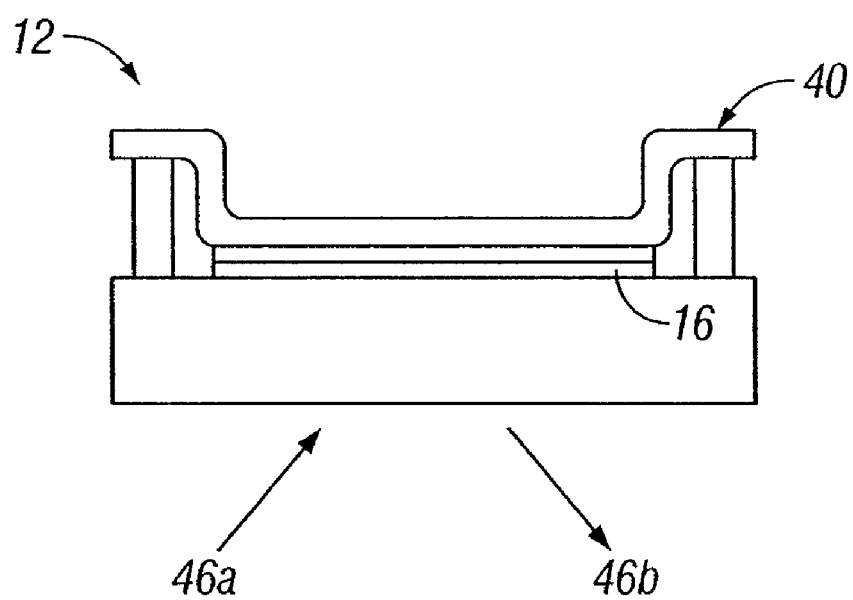
FIG. 8B is a side elevational view of the optical element of FIG. 8A in an OFF position.
Figure 9:
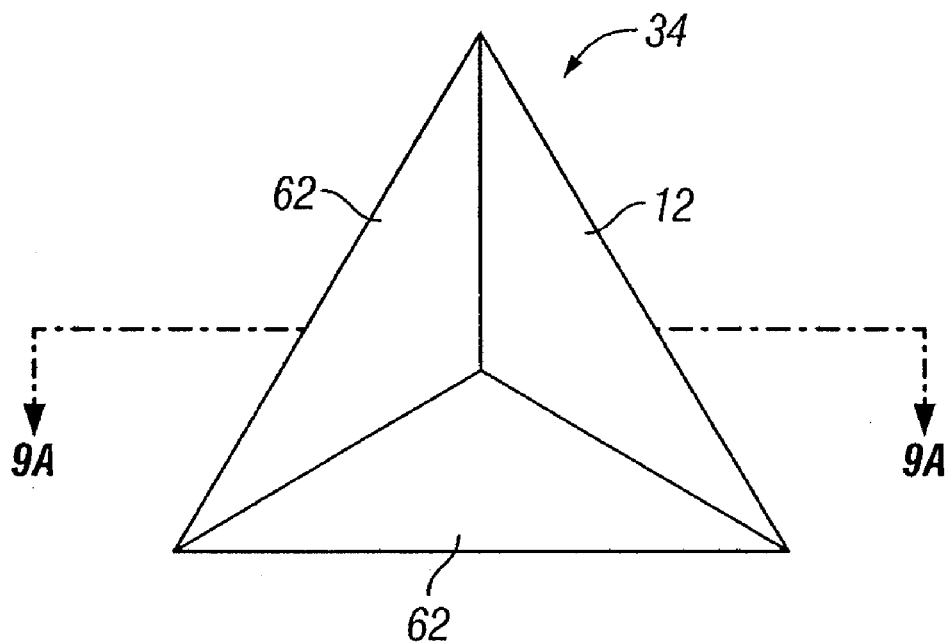
FIG. 9 is a perspective view of an embodiment of an interferometric modulator having one optical element.

The operation of the interferometric modulator optical elements which are located on at least one of the surfaces 35a, 35b of a corner interferometric display element 34 is now described in greater detail with respect to FIGS. 8 and 9. FIG. 8 schematically illustrates an optical element 12 of the modulator display element 34 in an undriven or undeflected state, such that given wavelengths of incident light will be reflected, as will be discussed in greater detail later. The optical element 12 has a wall or substrate 20 that may form one of the surfaces 35a, 35b of the modulator 34.

In the embodiment of FIG. 8, when the optical element 12 is in the unactuated or undriven position, it outputs light of a color based on the optical interference it has created. The reflectivity of such an element 12 (e.g., the wavelengths of light which it reflects) is a function of the state of the optical element, as well as the design of the element. As will be described more fully hereafter, when the optical element 12 is driven to its actuated state (alternately referred to as the driven, collapsed, or deflected state) illustrated in FIG. 8B, then the optical element 12 may be dark, i.e., reflecting no visible light wavelengths. However, in alternate embodiments, when the element 12 is driven to its collapsed state, the element may be in an essentially white state. For color pixels or modulators, the undriven state of the individual optical elements 12 may be white, red, green, blue, cyan, magenta, yellow, or other colors depending upon the modulated configuration and display, or device 32 color scheme. For simplicity, when optical elements such as 12 are described below, they may be described in terms of their color output in two states (e.g. red/black, or yellow/white), and a given state will be referred to by the color that it is configured to reflect (e.g. the "red" state, or the "white" state). It will be understood, and explained in more detail below, that an optical element having two particular states can be achieved in multiple ways by, for example, but not limited to, the choice of the materials used and the dimensions of the various components.

Referring again to FIG. 8A, optical element 12 includes a substrate 20, which preferably is a generally transmissive substrate which allows light to pass therethrough and into an interferometric cavity 19. The substrate 20 may comprise glass, polymers, plastic, and/or any material suitable for allowing the transmission of light rays. For example, a layer 16 is supported on a generally planar surface of the substrate 20 and may comprise the primary mirror/conductor. In one embodiment, the layer 16 is comprised of a transparent conductor coating upon which a mirror has been fabricated. In a preferred embodiment, a dielectric layer is fabricated on the side of the mirror opposite the conductor. In alternate embodiments, other combinations and arrangements of the transparent conductor, mirror, and dielectric layer may be used. Installation supports 18 extend from the substrate 32 such that their distal ends support a movable layer 40, which may comprise a second conducting layer 43 having a surface which opposes a surface of the layer 34, and a secondary mirror/conductor 41. The movable layer 40 may extend between the pair of supports 18 and may be under tensile stress to ensure that it is generally parallel to the substrate 20. The mirror/conductor 41 may optionally be integral, and part of, the movable layer 40. Thus, the layer 40 may comprise a plurality of layers. Alternatively, the layer 40 may be a single layer of material. For instance, movable layer 40 can be a movable highly reflective layer 14 (see FIG. 1). One of ordinary skill in the art will readily recognize the appropriate configuration, types of materials, number of layers, and other structural characteristics of the element 12 to achieve the desired mechanical and optical properties of the element 12. The cavity 19 is formed between the layer 16 and the mirror/conductor 41 and between the supports 18. Optionally, the cavity 19 may comprise a plurality of cavities. In the illustrated embodiment the cavity 19 is generally rectangular in shape.

Constructive interference in the cavity 19 determines the color of the viewable light emerging from the cavity 19. As the movable layer 40 moves towards the layer 16, the interference within the cavity 19 is modulated, and that modulation affects the color of light emerging through the layer 16 of the modulator. Because the layers 16 and 40 are generally parallel, optical radiation which enters the interferometric cavity 19 from above or below may undergo multiple reflections within the cavity, resulting in optical interference. Depending on the dimensions of the cavity 19, the interference will determine its effective impedance, and thus its reflected and/or transmissive characteristics. Changing one or more of the dimensions of the cavity 19 will alter the optical characteristics of the optical element 12. In the illustrated embodiment, changing of one of the dimensions, such as the gap or cavity height (i.e., the spacing between the layer 16 and the layer 40), alters the optical characteristics of the element 12. As discussed above, the height of the cavity 19 may be changed by applying a voltage across the two conductive layers 16, 40 at the cavity 19. This generates one or more electrostatic forces which may cause movement of the layer 40. In some embodiments, the layer 40 may be moved between the illustrated undriven state and a driven state, wherein the cavity 19 is partially or fully collapsed. The electrostatic force may be used to operate optical elements in a binary or analog mode.

With continued reference to FIG. 8A, the optical element 12 is configured for a binary mode of operation between an actuated and unactuated position. As shown, the optical element 12 is in the unactuated position and the cavity 19 is shown uncollapsed. This condition exists when generally no voltage is applied to the layer 40, or when the difference between the voltage applied to the layer 40 and the voltage on the layer 34 is less than a selected threshold value, if the optical element 12 is designed to have a hysteresis window. The bias of the layer 40 results in the layer 40 being generally parallel to the layer 16. In FIG. 8B, the cavity 19 is shown collapsed due to an electrical voltage being applied to the layer 40, such that the voltage differential between the layer 40 and the layer 16 exceeds the selected threshold value. In other words, voltage may be applied to the optical element 12 to generate a force which causes relative movement between the layers 16 and 40. One of ordinary skill in the art may select the desired amount of voltage to achieve the desired positions of the layers 16 and 40.

With continued reference to FIG. 8A, incident light 42 comprising a range of frequencies in the visible spectrum (e.g. white light) contains a spectral component which is at the resonant frequency of the optical element 12 in the unactuated state. The incident light 42 is partially reflected by the layer 16, and is partially or completely reflected by the movable layer 40. Consequently, this resonant component is reflected by the optical element 12 to a viewer, as indicated at 50. The non-resonant component of the incident light 46 undergoes destructive interference as a result of the multiple reflections, and is thus not reflected back to the viewer. Thus, when white light 46 is incident upon the optical element 12 in the unactuated state, light 50 at the resonant frequency of the optical element 12 in the unactuated state will be reflected to the viewer. Of course, the gap or height of the cavity 19 may be designed so that desired light 50 (i.e., light of a selected color) is reflected by the optical element 12 to a viewer.

FIG. 8B illustrates the optical element 12 in the actuated position such that the cavity 19 is generally collapsed. Because the distance between the layers 16, 40 has been changed, the resonant frequency of the device 12 has also changed. With other correct interferometric cavity dimensions, a substantial portion of incident light 46a is reflected as light 46b, and the optical element 12 functions essentially as a mirror when it is in an actuated state. Such an actuated state is referred to herein as a "white" state, although it will be understood that substantially white light can be generated in other ways, such as through the use of an optical element which has multiple resonant frequencies. In alternate embodiments of such optical elements, the light may undergo destructive interference when the element 12 is in the actuated state, and thus appear black, as discussed above.

One method for modifying the wavelengths of light that are reflected by an optical element 12 in an actuated state is to vary the properties of the layer 16. For instance, in a preferred embodiment in which the layer 16 comprises a dielectric layer, the height of the dielectric layer can be varied to achieve various colors in the actuated state. A very thin dielectric layer may result in the optical element 12 functioning essentially as a mirror, as discussed above, and thus reflecting white light in the actuated state. If the dielectric layer is made thicker, the optical element 12 may reflect no visible light in the actuated state, as the distance between the partially transmissive mirror in layer 16 and the mirror in movable layer 40 is extremely small compared to the wavelengths of visible light. As the height of the dielectric layer is further increased, the optical element may reflect various colors of visible light in the actuated state. As the height of the dielectric layer is increased yet further, the optical element 12 can be made to reflect substantially white light in the actuated state, as discussed above. It will be understood that this dielectric layer need not necessarily form a part of the layer 16, as has been previously discussed, but may instead be formed, for example, as part of the movable layer 40. So long as the dielectric layer is interposed between the reflective elements of layers 40 and 16, respectively, when the optical element is in an actuated state, varying the height of the dielectric layer may result in the properties of the actuated state discussed above.

FIG. 9 is a perspective view of one embodiment of the corner modulator display element 34 having at least one interferometric optical element 12 described above. In the illustrated embodiment, the display element 34 has one optical element 12 and a plurality of generally planar surfaces 62, on which a reflective layer has been placed, such that the generally planar surfaces 62 function essentially as a mirror. The shape and configuration of the surfaces 62 and optical element 12 may be different than or similar to each other.

Preferably, at least two of the surfaces 62 and the optical element 12 are generally orthogonal to each other. In some embodiments, one of the mirrors (e.g., the layer 40) of the optical element 12 and the surfaces 62 are generally orthogonal to each other. For example, the angle $\alpha$, made between one of the surfaces 62 and the substrate 20 of optical element 12, may be in the range of about 80 to about 100 degrees, more preferably about 90 degrees, although any appropriate angle $\alpha$ may be used, as discussed below. The optical element 12 and the surfaces 62 may therefore form a corner of an imaginary cube. In one embodiment, the optical element 12 defines an imaginary plane that is generally orthogonal to one or more of the walls of the display element 34.

Figure 9A:
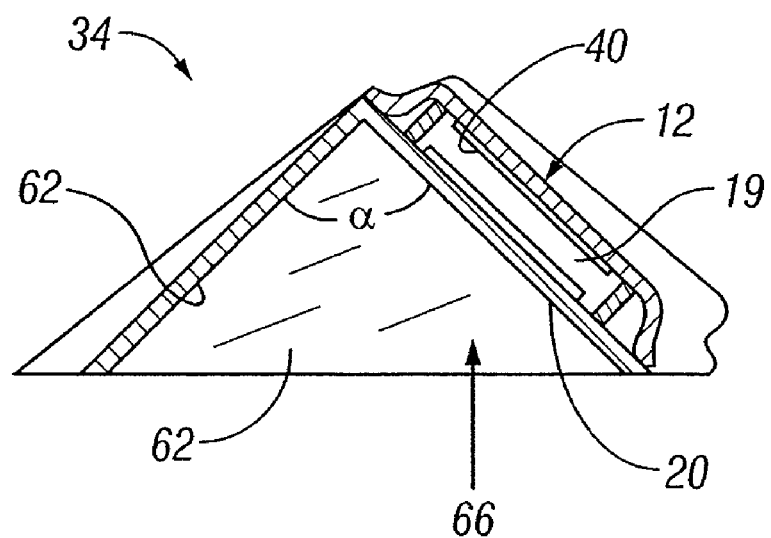
FIG. 9A is a cross sectional view of the interferometric modulator of FIG. 9 taken along line 9A-9A.

FIG. 9A shows a cross section of the embodiment of FIG. 9. The surface area of the planar surfaces 62 and the surface area of the planar surface on which optical element 12 is located, also referred to as substrate 20 (see FIG. 1), may be generally equal to each other. However, in other embodiments, the surface area of the substrate 20 and the surface area of the planar surfaces 62 may be different from each other. One of ordinary skill in the art may determine the size configuration of the substrate 20 and the surfaces 62 to achieve the desired optical properties. It will be understood that although the description refers to a substrate comprising multiple planar surfaces, the display element 34 may instead comprise two or more substrates joined together or otherwise fixed relative to one another. For instance, three triangular, substantially planar elements could be fixed together to form substrate 34. In alternate embodiments, three triangular, generally planar elements could be set into a frame which holds the pieces at angles relative to one another.

The optical element 12 of FIGS. 9 and 9A may have a binary or analog mode of operation. The optical element 12 of FIG. 9A is illustrated in an unactuated position. Thus, the movable layer 40 within the optical element 12 may be moved between two or more positions to achieve the desired optical interference within the cavity 19. The substrate is preferably stationary and defines a front viewing surface of the corner modulator display element 34. In one embodiment, the optical element 12 operates in a binary mode and actuates the layer or mirror 40 between the illustrated undriven state to a driven state where the chamber 30 is generally collapsed. In the illustrated undriven state, the incident light wave 66, which preferably forms an angle of incidence of about 45° with one of the optical element 12 or the pair of surfaces 62, interacts with at least one of the optical element 12 or the pair of surfaces 62. Preferably, the incident light 66 interacts with the optical element 28 and each of the surfaces 62 before it exits the modulator 24, as is discussed in greater detail with respect to FIG. 9B.

Figure 9B:
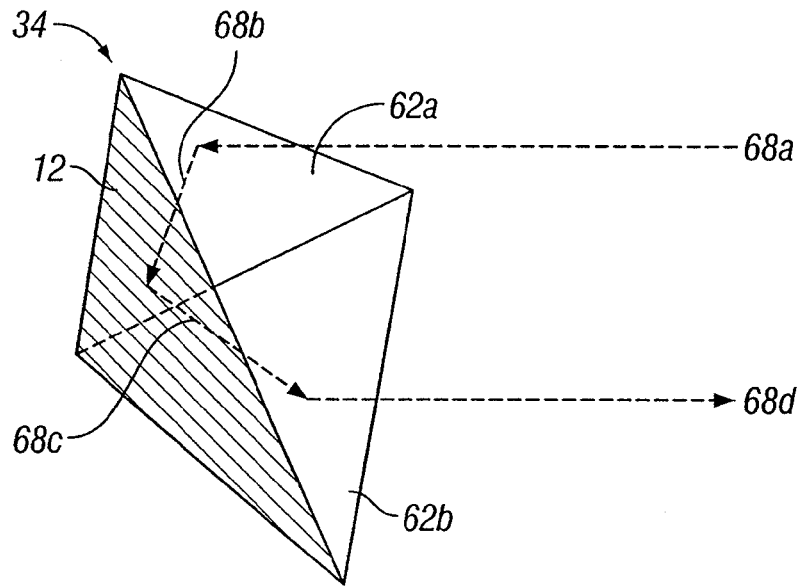
FIG. 9B is a perspective view of the interferometric modulator of FIG. 19, illustrating exemplary light paths.

FIG. 9B illustrates a perspective view of a corner modulator display element having an optical element 12 and reflective surfaces 62a, 62b. Light is incident upon a surface 62a of the corner modulator display element 34 along a path 68a. As surface 62a comprises a reflective surface, the light is then reflected along a path 68b to optical element 12. When light is incident upon optical element 12, the light interacts with the optical element. For instance, the optical element 12 may be a color/black optical element, such as a red/black optical element. In such a case when the optical element 12 is in the actuated state, the incident light 68b may be partially reflected by the modulator 12, for instance as red light. When the optical element 12 is in the actuated position, the internal reflection of the display element 34 is generally destroyed, and the optical element 12 appears black. If the optical element 12 is in a state such that light is reflected, it will be reflected along a path 68c to surface 62b. The light is then reflected away from the modulator along a path 68d. Thus, the interaction of light with the optical element 12 can result in either all, some, or none of the light incident on element 12 being reflected away from the modulator, depending on the characteristics and the actuation state of the element 12.

It can be seen that the incident light interacts with the internal surfaces of the display element 34 and may therefore be delivered back to the viewer such that the viewer sees the display element 34 as generally dark/white, or any desired color, depending on the L amount of light reflected back and the wavelengths of the reflected light. The thickness and/or the material index of one or more of the layers (e.g., layer 16 and/or layer 41) of the optical element 12 may be selected to produce a desired color when it is in the actuated position, as discussed above with respect to the dielectric layer. For example, the optical element 12 may reflect yellow light when it is in the actuated position. In another embodiment, the optical element 12 may be dark or black when it is in the actuated position. In yet another embodiment, the optical element 12 may be white when it is in the actuated position.

As was previously indicated, the state of the optical element 12 (i.e., whether the optical element is in the unactuated or actuated position), determines whether the viewer sees a particular color or whether the viewer sees a dark or bright element 12. The layer 16 may be coated so that the modulator display element 34 may be dark or reflective (e.g., outputting white light) in the actuated state depending on the coating or treatment (e.g., absorption filters) of the layer 16.

Advantageously, in an embodiment in which the surfaces 62a, 62b and optical element 12 are generally oriented orthogonally to each other, the modulator display element 34 may be oriented so that it generally reflects most or generally all of incoming light rays back along their original directions. Returning to FIG. 9B, it can be seen that, when each of the surfaces 62a, 62b and the optical element 12 are oriented orthogonally to one another, the incident light path 68a will be parallel to the light path 68d, along which the reflected light travels away from display element 34. Thus, because each of the surfaces of the modulator 34 can be reflective, an incident light ray 68a can bounce off each surface, in turn, with the net result being that the light rays undergo a 180 degree turn.

It will be understood by one having ordinary skill in the art that, depending on the design of the display element 34 and materials used in its construction, the angle $\alpha$ between the optical element 12 and one of the surfaces 62 may be an angle other than 90° in order to achieve the above-discussed property of embodiments of a display element 34 wherein modulated light is reflected back along a path parallel to the path of the incident light. The angle $\alpha$ will depend on such factors as the index of refractivity of the materials used in the construction of display element 34. One of ordinary skill in the art may thus determine the proper angles between optical element 12 and mirrors 62 in order to achieve the desired optical properties of the modulator display element 34.

While the wavelength of the light reflected by an optical element 12 is a function of such factors as the size of the air gap between the layers and the materials used in the construction of the optical element, the angle relative to a plane of the optical element at which a viewer is located will also have an effect on the wavelengths of light reflected to a viewer. This is because the length of the path traveled by a light ray transmitted by the layer 16 as it travels from the layer 16 to movable layer 40 and back to layer 16 is a function of the angle that the incident light ray makes with the normal, referred to herein as the angle of view. As the angle of view increases (i.e., the viewer moves away from the normal, and to the side of the display), the path traveled by the light ray within the cavity increases, and the optical path difference between the light which was reflected by the layer 16 and the light transmitted by the layer 16 is altered.

Figure 10:
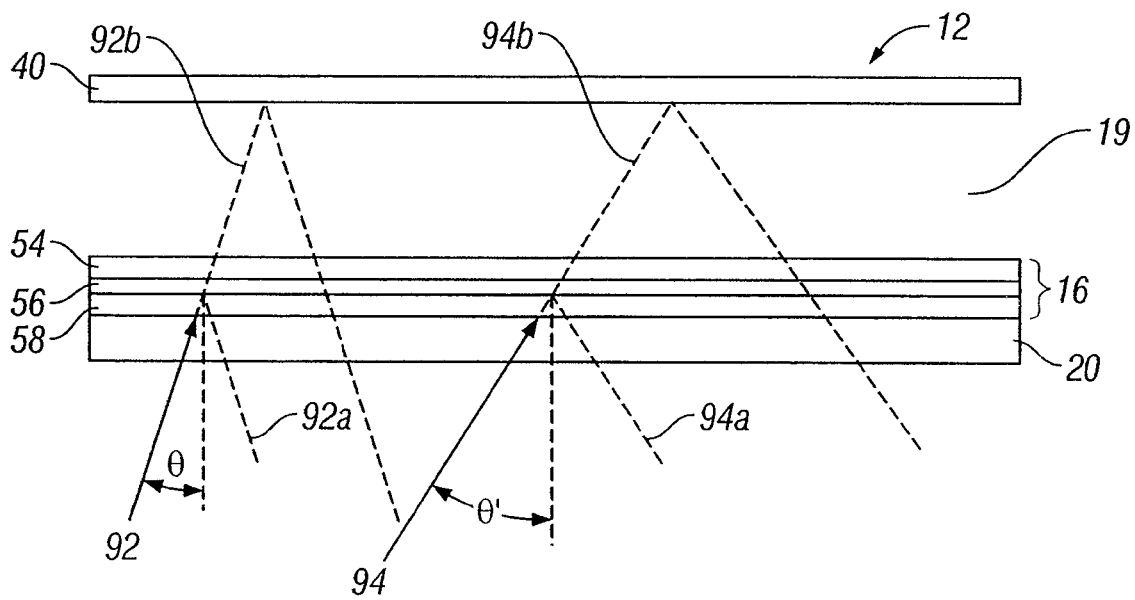
FIG. 10 is a side elevational view of an optical element similar to that of FIG. 8A, showing two exemplary light paths.

For example, in FIG. 10, a cross-section of a portion of optical element 12 is shown, similar to the optical element 12 shown in FIG. 8A. In this optical element 12, the layer 16 comprises a transparent conductor 58 on the substrate, a partially reflective layer 56 located on the side of transparent conductor 58 opposite the substrate, and a dielectric layer 54 located on the side of the partially reflective layer 56 opposite the reflective layer. Light 92 incident upon the partially reflective layer 56 at an angle $\Theta$ to the normal will be partially reflected along a path 92a, and partially transmitted along a path 92b through the layers 56 and 54, and then reflected by the movable layer 40. The wavelength $\lambda$ at which the interference occurs (and therefore the wavelength which is reflected by the optical element 92 to the viewer), is largely governed by the following equation:

$$N\lambda = -4(nh+g)\cos(\Theta),$$

where n is the dielectric constant of dielectric layer 54, h is the distance between the bottom of layer 54 and the top of layer 54 along a path normal to layer 54, g is the distance between the top of layer 54 and the bottom of layer 40 along a path normal to layer 54 (also referred to as the airgap), and N, referred to as the order of the interference maximum, is any integer. While the majority of the resulting interference is governed by the above equations, interference involving light reflected from other layers in the optical element can have an effect on the resulting interference, as well.

When light is incident instead along a path 94, at an angle $\Theta'$ to the normal (where $\Theta' > \Theta$), some of the light follows a path 94b within the optical cavity 19, which is longer than the path 92b. For a given optical cavity 12, it can thus be seen that the wavelengths which are reflected are directly proportional to the angle of view $\Theta$. Thus, as a viewer moves away from the normal, the effect on the modulated light reflected to the viewer is that the wavelength at which the interference occurs has been decreased. This effect is referred to herein as angle shift. It is possible to utilize a diffuser layer to help compensate for angle shift, but compensation for angle shift can be provided through the use of an embodiment of a display element having at least two substrates oriented at a non-zero angle to one another, the substrates having optical elements with similar reflective characteristics.

In some embodiments, a corner modulator display element 34 may comprise a plurality of the optical elements 12. For example, although not illustrated, the display element 34 of FIG. 9 may comprise a pair of optical elements 12 and one reflective surface 62. The optical elements 12 may be synchronized so that they are both either in the actuated position or the unactuated position. Preferably, when the optical elements 12 are in the unactuated position, the optical elements 12 each have an interference cavity 19 that is generally similar to each other, both in terms of the dimensions and the materials used. When the angle of incidence on the interferometric modulator 24 between the pair of optical elements 28 is approximately complementary, the angle shift from the optical elements 28 will approximately cancel each other out. The reduced or cancelled angle shift advantageously reduces or generally eliminates the influence of viewer angle on color shift. Preferably, incident light rays will be reflected off of both of the optical elements 12 to ensure that the influence of viewer angle on color shift is substantially reduced.

Figure 11:
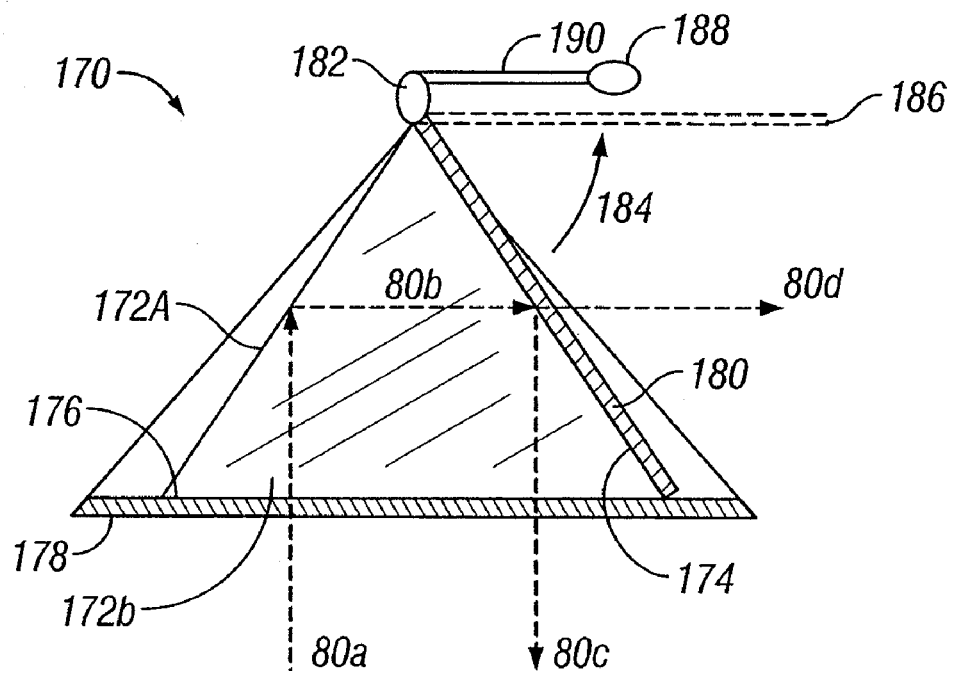
FIG. 11 is a cross sectional view of a modified embodiment of a corner display element which operates by actuating a moveable wall which frustrates the total internal reflection of the element.

FIG. 11 is a cross-sectional view of an embodiment of a display element comprising a pyramidal optical element 170 which comprises a material which is substantially transmissive to visible light. The pyramidal element 170 comprises three side surfaces 172a, 172b and 174 oriented at an angle to one another, and a base surface 176. The surfaces 172a, 172b and 174 are arranged at angles to one another such that light 80a incident upon the base surface 176 of the pyramidal optical element 170 may be reflected off each of the surfaces 172a, 172b and 174, and back through the base surface 176 along a path substantially parallel to the incident light. One having ordinary skill in the art will be able to determine the proper angles necessary for such properties, taking into account factors such as the index of refractivity of the pyramidal optical element 170, and the likely range of angles of incidence of incident light.

The index of refraction of the pyramidal optical element 170 is selected to be such that a substantial portion of light 80a incident upon the base surface 176 enters the pyramidal optical element 170 and may undergo total internal reflection at each of the surfaces 172a, 172b, and 174, before being transmitted out through the base surface 176. Thus, the pyramidal optical element 170 should be made of a material which has an index of refractivity which is substantially higher than that of air. For instance, in certain embodiments, glass, which has an index of refractivity of roughly 1.3, may be used. In preferred embodiments, plastics, which have may indices of refractivity of roughly 1.5-1.6, may be used. If a material having a very high index of refractivity is used for pyramidal element 170, light incident upon the interior surface of base surface 176 at a large angle relative to the normal may undergo total internal reflection and thus not be transmitted through the base surface 176. To prevent this, a layer 178 having an index of refraction somewhere between that of the pyramidal element 170 and air may be placed on the base surface of the pyramid, frustrating the total internal reflection and permitting the light to pass through the base surface 176 and onward to the viewer. In order to minimize the amount of light transmitted through surfaces 172a, 172b, these surfaces may comprise reflective elements (not shown).

Pyramidal optical element 170 further includes a movable layer 182, which may be transmissive to light and have an index of refraction selected to frustrate the total internal reflection that would otherwise occur at surface 174. As shown in FIG. 11, movable layer 180 may comprise a layer which can be actuated about a pivot point 182 in the direction shown by arrow 184 to a second position 186, shown in phantom. The movable layer 180 may be biased to be in the position shown in FIG. 15, against the surface 174 of pyramidal element 170, frustrating the internal reflection of surface 174.

The movable layer 180 may be actuated about the pivot point 182 by using electrostatic forces. The pyramidal display element 170 may include a conducting element 188 to which a voltage may be applied. A member 190 may extend from a backside of the display element 170 and hold the movable layer 180 in the illustrated position 186. The member 190 may comprise wires so that the element 188 is in electrical communication with a power supply. A voltage may be applied via the member 190 to the element 188 to generate an electrostatic potential which may build between the element 188 and the movable layer 180. The electrostatic potential draws the movable layer 180 towards the element 188. The movable layer 180 may comprise a conductive material and is electrically isolated from the element 188. In some embodiments, a spring or other bias means may be used to bias the movable layer 180 to a certain desired position. Although not illustrated, a plurality of elements 188 may be used to achieve any desired positioning of the movable layer 180.

The operation of the pyramidal optical element 170 is now described with respect to FIG. 11. Light 80a is incident upon the base surface 176 and is transmitted through to surface 172a, where it is reflected to surface 174 along path 80b. If the movable layer 180 is in the actuated position 186, the light 80b is reflected by means of total internal reflection, preferably to surface 172b and from there back to the viewer along path 80c. However, when the movable layer 180 is in the unactuated position, as shown in FIG. 11, the total internal reflection is frustrated, and the light is transmitted through surface 174 along a path such as 80d. Thus, a viewer observing the base surface 176 will see white light reflected from the pyramidal element 170 when the movable layer 180 is actuated, and see no reflected light (i.e. black), when the movable layer is unactuated and biased against surface 174.

Although not illustrated, one or more of the walls of the modulator display element 34 may have an optical element that is similar to an optical element 12 described above. For instance, surface 172a may comprise a red/white optical element 12 which reflects red light in an unactuated position, such that the pyramidal display element 170 can be configured such that it appears black, white or red to a viewer. If both the movable layer 180 and the optical element 12 are in an actuated position, the display element 170 will appear white to the viewer. If only the movable layer 180 is in an actuated position, the display element will appear red to the viewer. If the movable layer 180 is in an unactuated position, the display element 170 will appear black to the viewer, regardless of the state of the optical element 12.

Figure 12:
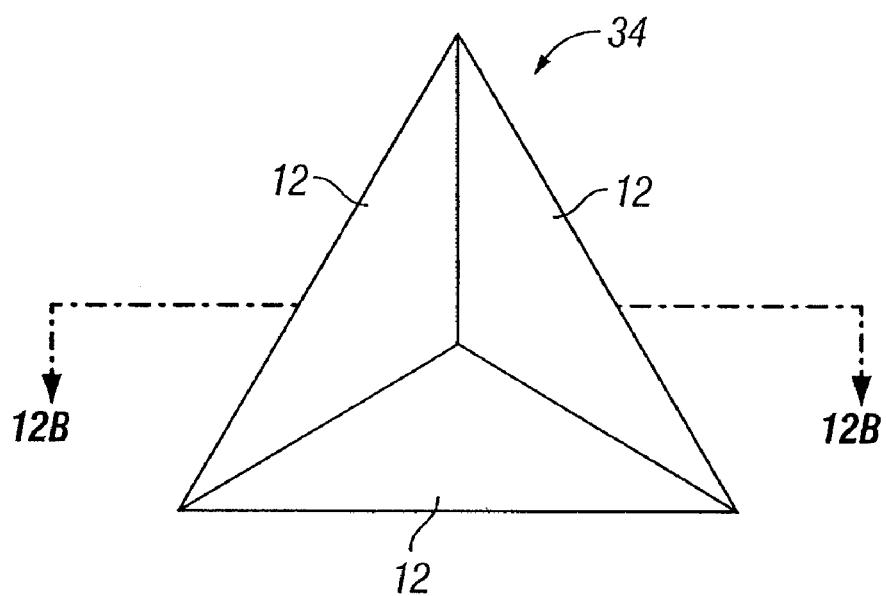
FIG. 12 is a top plan view of a modified embodiment of a corner interferometric modulator having a plurality of movable optical elements.
Figure 12A:
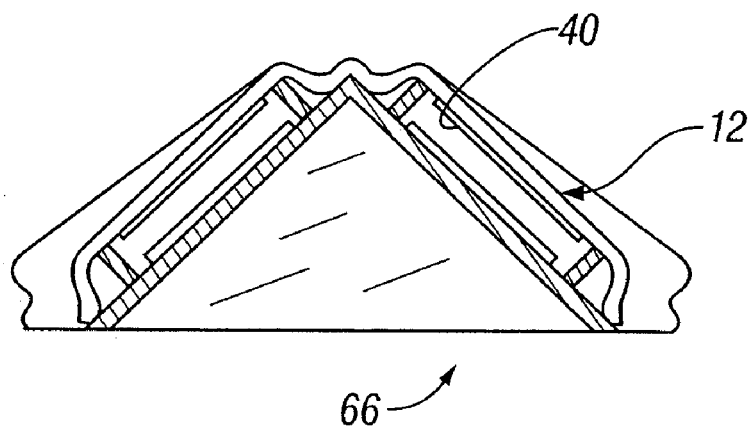
FIG. 12A is a cross sectional view of the interferometric modulator of FIG. 11 taken along the line 12A-12A.

FIGS. 12 and 12A illustrate another embodiment of the modulator display element 34 including three moveable optical elements 12 each configured to manipulate light rays. One or more of the optical elements 12 may operate in a binary mode and/or in an analog mode. For example, in one embodiment, one of the optical elements 12 operates in a binary mode while another of the optical elements 12 operates in an analog mode. The mode(s) of operation of each of the optical elements 12 may be selected to obtain the desired optical output from the display element 34.

The optical elements 12 may be actuated so that incident light 66 interacts with one or more of the optical elements 12 to reduce or eliminate the influence of viewer angle on color shift. One of ordinary skill in the art may determine the desired position of the reflective element (which may be movable layer 40, as previously discussed) of each of the optical elements 12 to result in the desired angle shift of the light rays which are reflected by each optical element 12. Because the incident light 66 may interact with all three of the optical elements 12, there are three opportunities to manipulate the rays of light. In other words, the display element 34 may cause angle shifts at three different positions as the light rays are reflected off of the display element 34, as the light will strike each of the optical elements at a non-zero angle to the normal.

The optical elements 12 of the modulator display element 34 may be synchronized or unsynchronized. In one mode of operation, one of the optical elements 12 may be in the unactuated position while the other two optical elements 12 are in the actuated position. Alternatively, two of the optical elements 12 may be in the unactuated position and the other optical element 12 may be in the actuated position. In the other embodiments, each of the optical elements 12 may be in the actuated or unactuated position.

For color displays, the modulator display element 34 may have individually movable optical elements 12 that are coated or treated to output white, red, green, blue, cyan, magenta, yellow, or other colors depending upon their modulator configuration and the display color scheme.

In one embodiment, the modulator display element 34 comprises three optical elements 12 that are capable of reflecting blue light, red light, and/or green light. Each of the optical elements 12 may be actuated together between the unactuated and actuated positions. In other words, in one embodiment the display element 34 may have three optical elements 12 that create interferometric blue light. In another embodiment, the modulator display element 34 may comprise three optical elements 12 that create interferometric red light. In yet another embodiment, the display element 34 may comprise three optical elements 12 that create interferometric green light. Advantageously, when the optical elements 12 of one modulator display element 34 simultaneously reflect the same color, the influence of viewer angle on color shift may be reduced or eliminated.

The system 32 illustrated in FIG. 7 may have adjacent modulator display elements 34 that create the same or different colors to produce a desired color. Known additive methods and techniques may be used to display any desired color from the system 32. Thus, the modulators 34 may be operated to achieve the desired combination of blue light, red light, and green light to produce full color images. Additionally, the optical elements may be driven to the unactuated position so that the modulator 34 is dark or white in order to produce, e.g., a black/white display.

In one embodiment, the system 32 comprises modulators 34, each of which contains at least one optical element 12. A given modulator 34 is capable of reflecting only one of the colors red, green, or blue, such that one-third of the modulators 34 are capable of producing red, one-third are capable of producing green, and one-third are capable of producing yellow. In order for such a display to produce yellow light, both the red and green modulators 34 must be set to reflect red and green light, respectively, and the blue modulators 34 must be set to reflect no light. This is an additive technique for producing a given color.

In an alternate embodiment, each of the surfaces of the modulator display elements 34 in display 32 includes a different optical element 12, e.g. one blue/white optical element, one red/white optical element, and one green/white optical element. Thus, by actuating two optical elements 12, a given color can be produced by display element 34. For example, in order to reflect green light, the red/white and blue/white optical elements must be actuated to their white positions. White light will be reflected when all three optical elements 12 are actuated to their white positions, and the modulator display element 34 will appear generally dark if less than two optical elements 12 are actuated to their white positions. For example, if both the red/white and green/white optical elements are in their red and green states, respectively, the red/white optical element will reflect only red light, and the green/white optical element will reflect only green light. Thus, white light incident on the corner modulator 34 and reflected off each of the three surfaces will not be reflected back from the modulator 34.

In another embodiment, the optical elements 12 of the modulator display element 34 of FIGS. 12 and 12A may be cyan/white, magenta/white, and yellow/white optical elements. That is, the cavity 19 of the optical element 12 may be designed to achieve the desired interference color of cyan, magenta, and/or yellow. Each of the optical elements 12 may be individually operated and moved to the proper state to subtract out a desired color to produce full color images by using the subtractive method and techniques which are known in the art. Each of the optical elements 12 may be in the white position to achieve generally white display from the modulator display element 34. Each of the optical elements 12 may be in the non-white (e.g. cyan, magenta, or yellow) state to create an optical element which appears black, as each of the optical elements will subtract out a different portion of the range of incident visible light.

In this embodiment, in order to generate a given color, either additive or subtractive techniques may be used, or a combination of the two may be used. For example, yellow can be generated using a subtractive technique by moving the yellow/white optical element to the yellow position, and moving the other optical elements in the modulator display element 34 to the white positions. This is referred to as a subtractive technique, as each of the individual display elements 34 generates yellow by subtracting out the blue wavelengths from the incident light.

If a lighter yellow (e.g., a shade that would result from a combination of yellow and white light) is desired, this color can be generated either through the use of a combination of additive and subtractive techniques, as will be discussed below. A combination technique can be used wherein half of the display elements 34 in the display generate yellow through the subtractive technique discussed above, and the other half of the display elements 34 generate white (by placing all three of the optical elements 12 in the white state). The addition of the white and yellow light will create the lighter yellow desired.

In a further embodiment, each the surfaces of the modulate display elements comprises a plurality of individual optical elements having substantially similar optical characteristics to the other optical elements on that surface. In such an embodiment, a lighter yellow could be generated by a single corner modulator display element, by placing half of the yellow/white optical elements on a given surface in the yellow position and half in the white position, so that only roughly half of the blue light incident upon the display element 34 is reflected, creating the desired lighter yellow color.

Thus, the optical elements 12 of modulator display element 34 may deliver any suitable color depending on the desired display color scheme.

The use of subtractive techniques to use a modulator display element 34 to generate a particular color advantageously permits the creation of a much brighter display than a similar display which employs purely additive techniques. In embodiments in which additive techniques are used, and in which a given display element can only display either red, green, or blue, a large amount of brightness is lost, as each display element only reflects a small amount of the spectrum of white light incident upon it, corresponding to the wavelengths being reflected. In order to generate, for instance, yellow, a number of display elements 34 reflecting red light, and a number of display elements 34 reflecting green light, can be used to generate yellow light. However, the display elements which are set to reflect red light will not reflect the green wavelengths, and vice versa. Thus, the brightness of this yellow is roughly half of what it would have been had each of the display elements reflected yellow light. In addition, if the display elements 34 which are capable of reflecting blue light are dedicated blue elements (rather than the tricolor corner additive display elements discussed above), these display elements must be set to reflect no light at all. In such an embodiment, the brightness of the yellow light is roughly one-third of what would be possible if each of the display elements 34 could be set to reflect yellow light.

By utilizing subtractive techniques, each display element can now be made to reflect both the red and green wavelengths which comprise yellow light. The yellow/white optical element 12 in each of the display elements 34 is placed in the yellow state (and thus, blue wavelengths are not reflected), and the other optical elements are placed in the white state. Such a display can be as much as three times brighter than a display in which dedicated display elements generate colors via additive techniques, for the reasons discussed above.

Because light reflected by corner modulators will generally be reflected to the viewer along a path parallel to the path along which it traveled to the corner modulators, the light source must be located roughly behind the viewer. As such, in order for a display utilizing corner modulators to be used, the display must either comprise a light source disposed between the viewer and the display, such as a light guiding plate, or the display must be located a sufficient distance from the viewer that incident light is not blocked by the viewer itself.

Corner modulators of the type discussed herein are thus particularly well-suited for use in large devices located at a large distance from a viewer. For instance, corner interferometric modulators could be used to create a highly reflective dynamic traffic sign, which would be easily visible to drivers, as their headlights would provide illumination along a path close to parallel to the viewing path of the driver. Billboards and very large video screens, such as those at sporting venues, would be another application to which corner interferometric modulator displays would be well suited.

For large scale applications such as the billboards and video screens the hysteresis properties of interferometric modulators may not be as critical to the design of the display as it would be in, for example, a cell-phone display, where minimizing power consumption is critical. Thus, trade-offs can be made in terms of the design and the materials used in construction of large-scale displays utilizing such corner modulator display elements. An optical element 12 which does not exhibit hysteresis behavior may be advantageous, for example, in that greater freedom in driving the optical element 12 can be obtained, at the cost of greater power consumption.

Figure 13A:
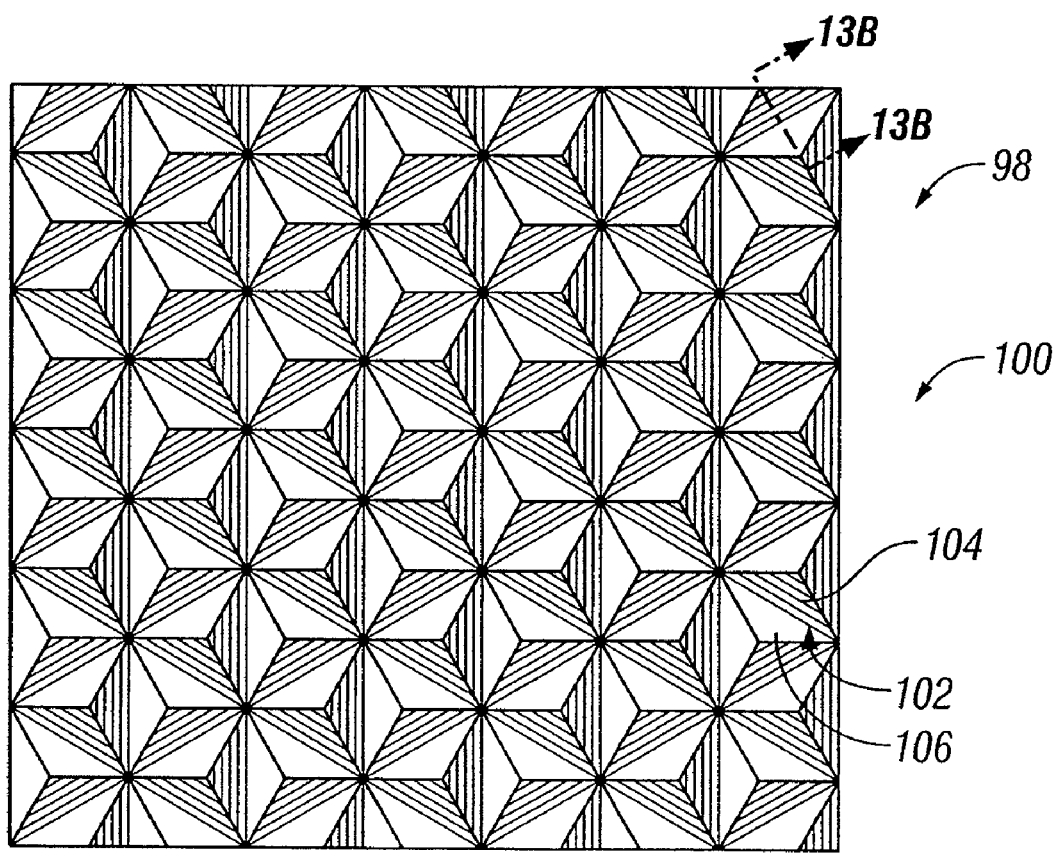
FIG. 13A is a top plan view of another embodiment of a system having an array of interferometric modulators configured to interact with light rays.

FIG. 13A illustrates a system 98 having an array 100 of V-shaped modulators 102 forming by opposing faces of adjacent positive pyramidal shapes. Each of the V-shaped modulators 102 has one or more surfaces at an angular relationship to other surfaces. In the illustrated embodiment, the modulators 102 have generally triangular viewing surfaces 104, 106. Incident light may interact with both of the surfaces 104, 106, which may manipulate the light rays. Advantageously, the modulators 102 provide two opportunities to manipulate the light rays. For example, the modulators 102 may manipulate the light rays each time the light strikes the surfaces 104, 106. In some embodiments, the modulators 102 may have optical elements similar to the optical elements 12 or 180 described above for affecting light rays. Alternatively, the modulators 102 may have optical elements shown in FIG. 13B and described below.

Figure 13B:
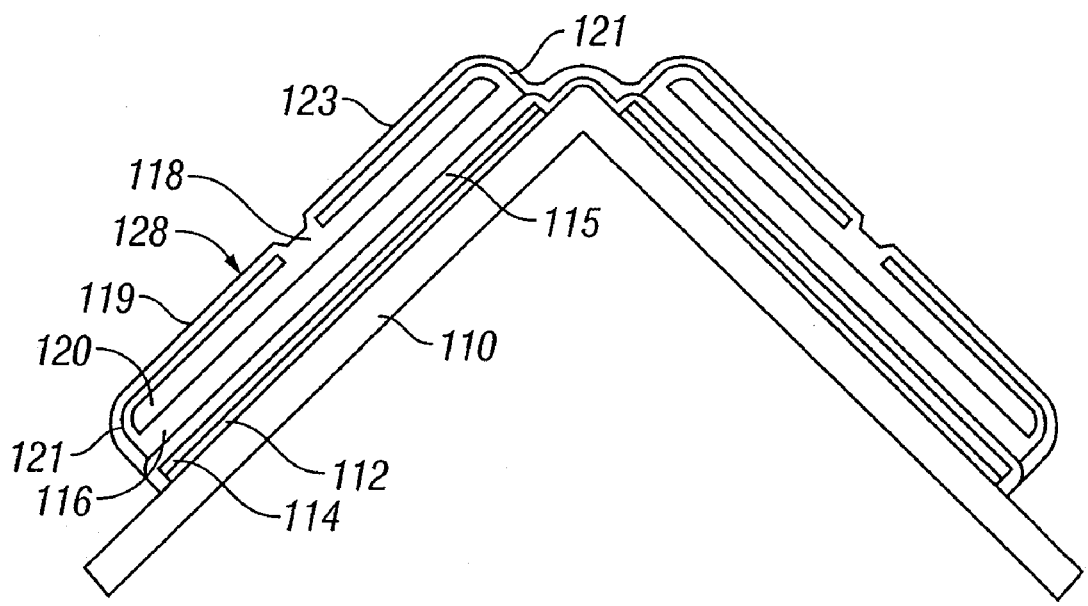
FIG. 13B is a cross sectional view of another embodiment of movable optical elements of FIG. 13A taken along the line 13B-13B.

FIG. 13B is a cutaway view of an alternate embodiment of the V-shaped modulators 102 of FIG. 13A, and illustrates a modified embodiment of a pair of optical elements 128. These optical elements 128 represent an alternative design which may be used in place of optical elements 12 in any of the embodiments disclosed herein, and are similar to the optical element discussed with respect to FIG. 6C. In the illustrated embodiment, the optical element 128 comprises an electrode layer 112 secured on a transparent substrate 110, which is preferably typical glass or transparent plastic. The optical element 128 preferably has a reflective layer 114 interposed between a dielectric layer 115 and the electrode 112. An outer member 119 has side walls 121 connected to an upper layer 123. A cavity support 118 extends from the upper layer 123 and is connected to a mirror 120. In some embodiments, the mirror 120 is integral, and part of, the outer member 119. The side walls 121 and the mirror 120 define the cavity 116. In operation, when a voltage is applied to the electrode 112 and transparent substrate 110, the mirror 120 is electrostatically drawn towards the transparent substrate 110. The outer member 119 may deform as the mirror 120 is moved relative to the transparent substrate 110. The movement of the mirror 120 changes the dimensions of the cavity 116 and causes light within the cavity to be modulated by interference.

Figure 14A:
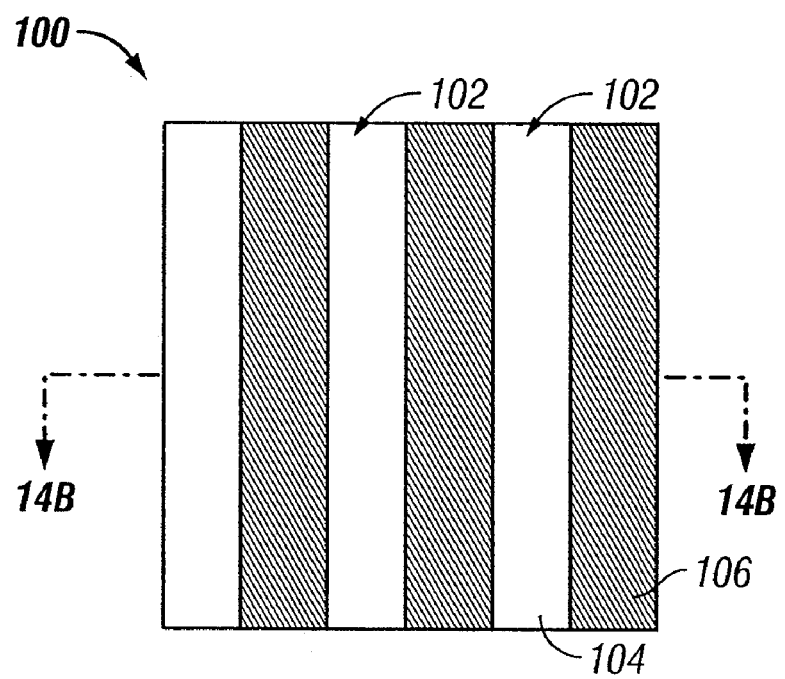
FIG. 14A is a plan view of another embodiment of a modulator system having an array of interferometric modulators.

FIG. 14A illustrates a top plan view of a modified embodiment of the system 98 comprising V-shaped modulators 102 defining v-shaped grooves or channels. The modulators 102 may comprise one or more optical elements 12, 128, or 180 as described above.

Figure 14B:
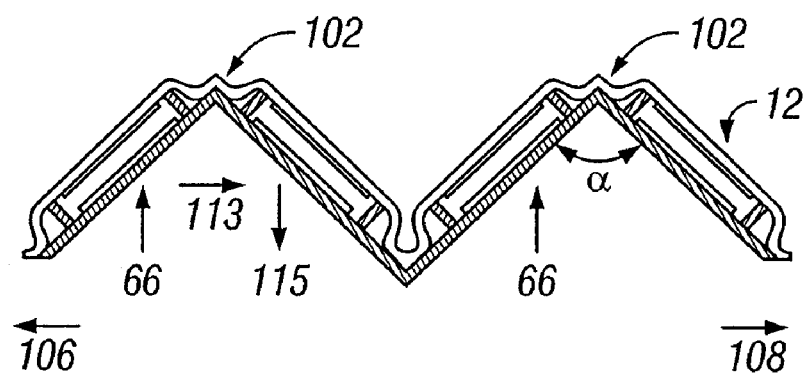
FIG. 14B is a cross sectional view of the modulator system of FIG. 14A taken along the line 14B-14B wherein the modulators have a pair of movable optical elements.

As shown in FIG. 14B, each of the modulators 102 may comprise a pair of the optical elements 12. The optical elements 12 may be in an operational state to provide color shift correction in at least one direction. For example, the modulators 102 may provide color shift correction in the direction of the arrows 106 and/or 108. In one preferred embodiment, when the optical elements 12 are in the ON position, they form an internal cavity having a gap that is generally similar to the gap of the other optical element 12. When the optical elements 12 are in this arrangement, incident light 66 may be manipulated by one of the optical elements 12 and reflected along a path 113 to the other optical element 12 which, in turn, manipulates the light and reflects the light along a path 115 back to the viewer. Advantageously, the modulator 102 may reduce or preferably cancel out angle shift to reduce or eliminate the influence of viewer angle on color shift. Preferably, the optical elements 12 are generally orthogonal to each other. However depending on the design and the materials used in the construction of the modulators 102, it may be necessary to place the elements optical 12 at an angle to one another which is something other than roughly 90° in order to reflect light back to the viewer along a path 115 parallel to the path 66 of the incident light.

While the v-shaped grooves 102 may be oriented in any direction in order to compensate for angle shift, a series of horizontal grooves will provide compensation for angle shift resulting from motion of the viewer within a plane orthogonal to the axis of the groove 102. In a vertically oriented display, such as a television or a computer display, the viewer is far more likely to be offset from the center of the screen in a horizontal direction, rather than a vertical direction. Thus, an embodiment in which vertically oriented grooves 102 having similar optical elements 12 on each side of the grooves 102 will provide compensation for angle shift in a horizontal direction, which may be sufficient compensation for many interferometric modulator-based displays.

Although not illustrated, it is contemplated that the optical elements disclosed herein may be positioned on the interior of the corner reflector modulators 24 or the v-shaped modulators 102. Thus, the optical elements 12 and/or 128 may be disposed on the interior or the exterior of the corner reflector modulators 24. Similarly, the optical elements 12 and/or 128 may be disposed on the interior or the exterior of the v-shaped modulators 102. Light may pass the optical elements in any suitable direction for manipulating the light rays.

The viewing surfaces of the modulators disclosed herein may be polygonal, curved, flat, circular, elliptical, and/or any other suitable shape for interacting with light. Additionally, each wall or viewing surface of the modulator disclosed herein may have more than one optical element (e.g., optical elements 12 or 70). Thus, an array of optical elements may be located along one or more of the walls of an interferometric modulator.

Interferometric modulators disclosed herein may be formed through a variety of fabrication processes. For example, the fabrication processes described in U.S. Pat. No. 5,835,255 may be modified to produce the interferometric modulators disclosed herein. Additionally, general fabrication methods for producing the disclosed modulators are described below.

Figure 15A:
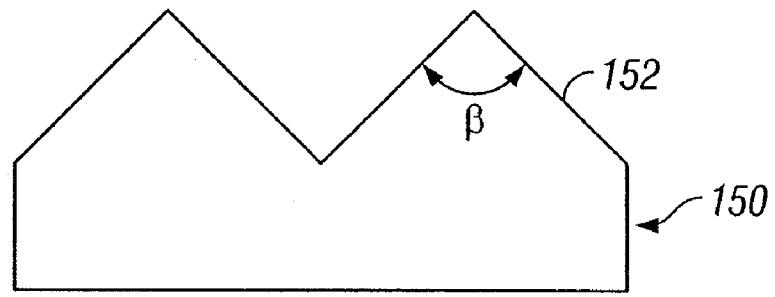
FIGS. 15A to 15H schematically illustrate aspects of a process flow for fabrication of an interferometric modulator.

FIGS. 15A to 15H illustrate one process flow for fabrication of an interferometric modulator disclosed herein. FIG. 15A illustrates a substrate 150 used as the starting material to form a corner reflector modulator. The substrate 150 has a pattern 152 that preferably comprises an array of positive features that project outwardly from the body of the substrate 150 and have adjacent forward surfaces that preferably form an internal angle $\beta$ that is in the range of about 85 degrees to about 95 degrees. In one preferred embodiment, the angle $\beta$ is about 90 degrees. The angle $\beta$ may be varied and selected by one of ordinary skill in the art to define the orientation between the surfaces which form the pattern 152, as necessary to achieve the desired optical characteristics. In the illustrated embodiment, the substrate 150 has a pattern 152 comprising a plurality of cubic corners extending therefrom.

The pattern 152 may be formed by various suitable methods and conventional techniques well known to those skilled in the art. Those of ordinary skill in the art will appreciate that the fabrication process described herein may be carried out by using conventional manufacturing techniques such as embossing, etching, photolithography, stereolithography, micromachining, scrolling, cutting, molding, or any other suitable means for forming the features of the substrate 150. In one embodiment, the substrate 150 has a pattern 152 that is formed through a micro-embossing process. For example, a formable material, preferably a transparent polymer, may be contacted with an embossing tool having a pattern which is essentially the inverse of the embossed pattern 152. That is, the embossing tool may have a pattern of negative features that are essentially the inverse of the positive features of the pattern 152. After the desired pattern 152 has been formed, the embossing tool may be moved away from the substrate 150 thus forming the pattern 152. Alternatively, etching techniques may be used to form the desired pattern 152. For example, chemical etching, mechanical etching, or other ablative means such as laser, ablation, or reactive ion etching may be used to form the micro-embossed pattern 152. One of ordinary skill in the art may select the manufacturing technique for forming the pattern 152 on the substrate 150 based on, e.g., the dimensions and configurations of the features of the pattern 152, production times, and/or other manufacturing parameters.

Figure 15B:
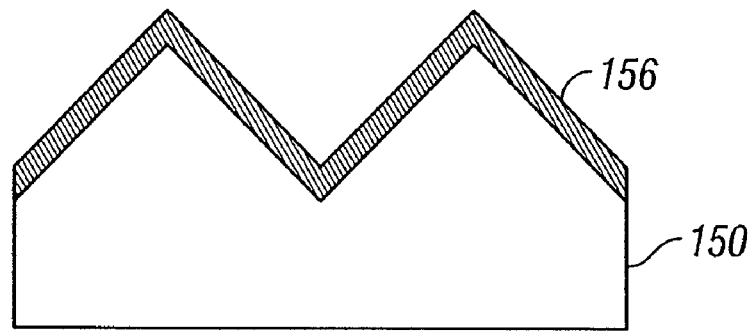
Figure 15C:
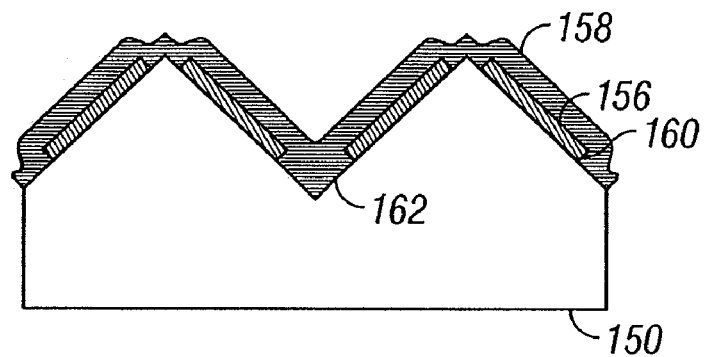

An optical element 28 may be formed on the substrate 150. To do this, an electrode is formed on the substrate 150. As shown in FIG. 15B, electrode material 156 is deposited on the substrate 150. The electrode material 156 may then be processed to remove a portion of its material. In the illustrated embodiment of FIG. 15C, the electrode layer 156 has undergone a patterning and etching process forming the electrode 160. After the electrode material 156 has been etched, a dielectric layer 158 is deposited over the first electrode 160 and the exposed portions 162 of the substrate 150. The first electrode material is electrically conductive and may be a metal or a semiconductor, such as silicon, preferably doped to have the desired conductivity. In one embodiment, the first electrode 160 is a multilayer structure comprising a transparent conductor, such as indium tin oxide, and a primary mirror, such as chromium. In another embodiment, the first electrode 160 is a multilayer structure comprising a transparent conductor, such as indium tin oxide and a dielectric layer (e.g., silicon oxide) and a primary mirror. The dielectric layer 158 may be silicon oxide. One of ordinary skill in the art may determine the materials and the dimensions of the first electrode 160 to achieve the desired optical properties for an interferometric optical element.

Figure 15D:
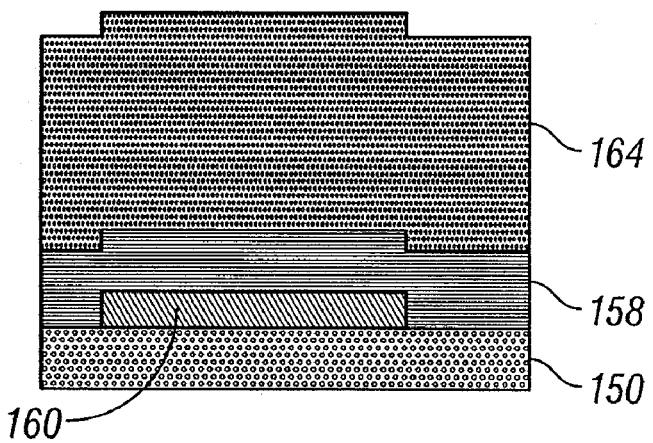
Figure 15E:
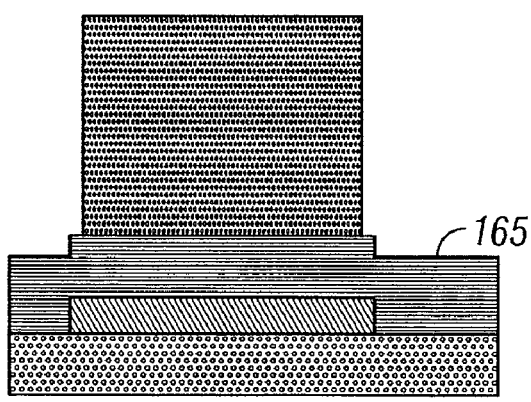
Figure 15F:
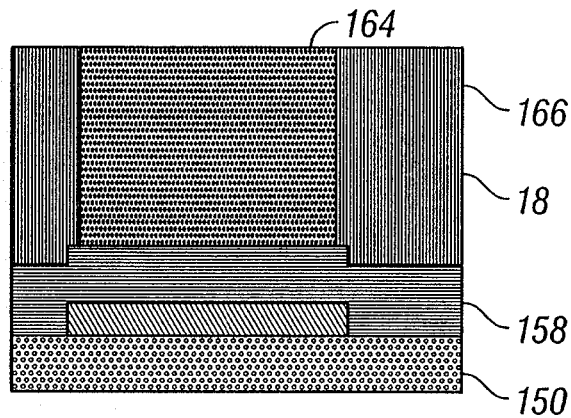

For the sake of simplicity FIGS. 15D through 15H show only one section of the substrate 150. As shown in FIG. 15D, a sacrificial layer 164 may be deposited over the dielectric layer 158. Masking and etching of the sacrificial layer 164 may form holes or recessed regions 165 as shown in FIG. 15E. A material 166 may be deposited into the recessed regions 165 to form support structures 18, as shown in FIG. 15F. The sacrificial layer 164 may be molybdenum and may be etched by exposure to $XeF_2$ vapor. The material 166 may be a negative photoresistant material. The material 166 may be a polymer, metal, oxide, or any other material suitable for filling the recessed region 165.

Figure 15G:
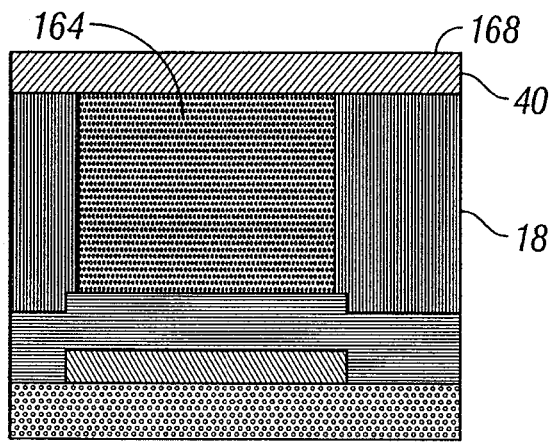
Figure 15H:
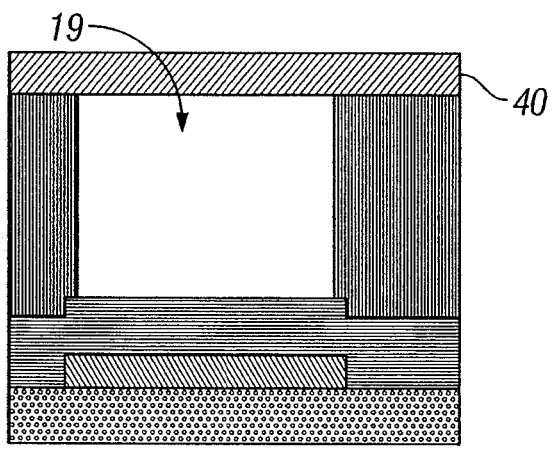

With respect to FIG. 15G, a second electrode 168 may then be deposited over the post structures 18 and the sacrificial layer 164 to form a part of the movable layer 40 (see FIG. 8A). The second electrode 40 is electrically conductive and may be a metal or semiconductor such as silicon, doped to have the desired conductivity. The movable layer 40 and the conductive layer 158 may be made of similar or different materials. In alternative process flows (not shown), a multi-step process is used to fabricate a second electrode that is suspended from a mechanical layer (such as that seen in FIG. 14). The sacrificial layer 164 is then removed by, e.g., etching, to form an interferometric cavity, such as cavity 19, as seen in FIG. 15H. A molybdenum sacrificial layer 164 may be removed through exposure to $XeF_2$ vapor. Those of ordinary skill in the art will appreciate that the process flow for fabricating an interferometric modulator, as is illustrated and described herein, may have the sacrificial layer and post or support structures 18 formed from different materials, e.g., molybdenum (sacrificial layer) and polymer photo resistant (post structure), that are deposited at one or more different stages of the fabrication process.

In alternate embodiments, particularly embodiments wherein the surfaces of the display elements are very large relative to the scale of the components of the optical elements 12 or 128, such as billboards or street signs, multiple planar substrates may be assembled to created the display elements 34. For instance, three optical elements 12 may be formed on planar surfaces of one or more of three separate triangular glass substrates, which substrates are then fixed at an angle to one another in order to form a display element 34. Alternately, optical elements may be formed on non-triangular substrates, portions of which are selectively removed to form generally triangular substrates. Such a fabrication process may be advantageous in that formation of a large substrate having multiple positive features may be difficult when the eventual displays are to be very large, and in that existing equipment capable of fabricating optical elements on planar substrates can be used without the need for modification.

In an alternate embodiment, the electrode layer of display element 34, which in the above discussed embodiments is formed on the same surface as the rest of the optical element, may instead be replaced by one or more electrodes located elsewhere in the display element 34. In one embodiment, an electrode is formed at the base of display element 34, such that a single electrode can actuate each of the optical elements 12 of display element 34 simultaneously. Such an arrangement may be advantageous in embodiments wherein a display element 34 has multiple optical elements with similar reflective characteristics in order to compensate for angle shift. This arrangement may simplify both the driving scheme and fabrication of such display elements, although a higher activation voltage may be required to place the optical element in the driven state.

The systems and modulators disclosed herein may be formed through any suitable means. The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the artisan of ordinary skill will recognize the interchangeability of various features from different embodiments disclosed herein. Similarly, the various features and steps discussed above, as well as other known equivalents for each such feature or step, may be mixed and matched by one of ordinary skill in this art to perform methods in accordance with principles described herein. Additionally, the methods which is described and illustrated herein is not limited to the exact sequence of acts described, nor is it necessarily limited to the practice of all of the acts set forth. Other sequences of events or acts, or less than all of the events, or simultaneous occurrence of the events, may be utilized in practicing the embodiments of the invention.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A display, comprising
   a first light-transmissive substrate portion, said first substrate portion comprising a first surface and a second surface;
   a second light-transmissive substrate portion fixed relative to the first substrate portion, said second substrate portion comprising a first surface and a second surface, wherein said first surface of said second substrate portion is oriented at a first non-zero angle to the first surface of the first substrate portion;
   at least a first reflective element supported by the second surface of the first substrate portion, wherein said first reflective element has a first reflectivity which changes in response to a first signal, wherein the first reflectivity of the first reflective element comprises a range of wavelengths reflected from said first reflective element, said range of wavelengths changing in response to said first signal; and
   at least a second reflective element supported by the second surface of the second substrate portion.

2. The display of claim 1, wherein the second reflective element comprises a reflective layer on the second surface of the second substrate portion.

3. The display of claim 1, wherein the second reflective element has a second reflectivity which changes in response to a second signal.

4. The display of claim 1, wherein the first non-zero angle is approximately 90 degrees.

5. The display of claim 1, additionally comprising a third substrate portion comprising a first surface and a second surface, wherein the first surface of the third substrate portion is oriented at a second non-zero angle to the first surface of the first substrate portion and at a third non-zero angle to the first surface of the second substrate portion.

6. The display of claim 5, further comprising at least a third reflective element supported by the second surface of the third substrate.

7. The display of claim 5, wherein:
the second reflective element has a second reflectivity which changes in response to a second signal; and
the third reflective element has a third reflectivity which changes in response to a third signal.

8. The display of claim 1, wherein the first reflective element comprises a reflective layer movable between at least a first position and a second position, and a partially reflective layer located between said movable reflective layer and the second surface of the first substrate portion.

9. The display of claim 8, wherein the first reflective element reflects generally white light when the movable reflective layer of the first reflective element is in the first position and white light is incident on said first reflective element.

10. A display, comprising:
a support structure, said support structure comprising a first surface and a second surface, wherein said first surface is fixed relative to the second surface and oriented at a first non-zero angle to the second surface;
at least a first reflective element supported by the first surface, wherein said first reflective element has a first reflectivity which changes in response to a first signal, wherein the first reflectivity of the first reflective element comprises a range of wavelengths reflected from said first reflective element, said range of wavelengths changing in response to said first signal; and
at least a second reflective element supported by the second surface.

11. The display of claim 10, wherein portions of the support structure underlying the first and second reflective elements are transmissive to light.

12. The display of claim 10, wherein the first reflective element comprises a reflective layer movable in response to the first signal.

13. The display of claim 12, wherein the first reflective element reflects a first range of wavelengths of light when the movable layer is in a first position, and a second range of wavelengths of light when the movable layer is in a second position, wherein said first range of wavelengths are different than said second range of wavelengths.

14. The display of claim 12, wherein the second reflective element has a second reflectivity which changes in response to a second signal.

15. The display of claim 14, wherein the second reflective element comprises a reflective layer movable in response to the second signal.

16. The display of claim 10, wherein the support structure additionally comprises:
a third surface, wherein said third surface is oriented at a second-non-zero angle to the first surface, and at a third non-zero angle to the second surface; and
a third reflective element supported by the third surface.

17. The display of claim 16, wherein the second reflective element has a second reflectivity which changes in response to a second signal, and wherein the third reflective element has a third reflectivity which changes in response to a third signal.

18. The display of claim 17, wherein the second reflective element comprises a reflective layer movable in response to a second signal, and wherein the third reflective element comprises a reflective layer movable in response to a third signal.

19. A device, comprising
a support structure comprising a first surface and a second surface oriented at a first non-zero angle to the first surface;
a microelectromechanical system (MEMS) structure supported by the first surface, wherein said MEMS structure comprises a first electrode and a second electrode, wherein the first electrode is displaceable relative to the second electrode upon application of a voltage across said first and second electrodes between a first position spaced apart from the second electrode and a second position closer to the second electrode than in the first position, wherein at least a portion of the first electrode is oriented substantially parallel to the second electrode in each of the first and second positions; and
a first reflective structure supported by the second surface.

20. The MEMS device of claim 19, wherein the support structure additionally comprises:
a third surface oriented at a second non-zero angle to the first surface and at a third non-zero angle to the second surface; and
a second reflective structure supported by the third surface.

21. The MEMS device of claim 20, wherein each of the first and second reflective structures comprise a pair of electrodes, wherein one of the electrodes of the pair of electrodes is displaceable relative to the other electrode of the pair of electrodes upon application of a voltage across said pair of electrodes.

22. The MEMS device of claim 19, additionally comprising a dielectric layer overlying the second electrode, wherein the portion of the first electrode parallel to the second electrode contacts the dielectric layer when the first electrode is in the second position.

* * * * *